(12) United States Patent
Kubota

(10) Patent No.: US 11,590,783 B2
(45) Date of Patent: Feb. 28, 2023

(54) PRINTING APPARATUS, PRINTING SYSTEM, CONTROL METHOD, AND STORAGE MEDIUM

(71) Applicant: CANON KABUSHIKI KAISHA, Tokyo (JP)

(72) Inventor: Tomohide Kubota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 16/912,466

(22) Filed: Jun. 25, 2020

(65) Prior Publication Data

US 2020/0406653 A1 Dec. 31, 2020

(30) Foreign Application Priority Data

Jun. 27, 2019 (JP) .............................. JP2019-120040

(51) Int. Cl.
*B41J 29/38* (2006.01)
*G06F 3/12* (2006.01)

(52) U.S. Cl.
CPC ............ *B41J 29/38* (2013.01); *G06F 3/1296* (2013.01)

(58) Field of Classification Search
CPC ........ G06F 3/1204; G06F 3/1236; B41J 29/38
See application file for complete search history.

(56) References Cited

U.S. PATENT DOCUMENTS 10,162,583 B2 * 12/2018 Ge ...................... G06F 3/1204

FOREIGN PATENT DOCUMENTS

JP 2010211627 A 9/2010

\* cited by examiner

*Primary Examiner* — Lam S Nguyen
(74) *Attorney, Agent, or Firm* — Canon U.S.A., Inc. IP Division

(57) ABSTRACT

A printing apparatus includes one or more memories, and one or more processors that execute a set of instructions to transmit information for identifying print data to a different printing apparatus, receive a print request including print data, store the print data included in the received print request in the memories, and print data, wherein, in a case where the received print request is a print request transmitted from the different printing apparatus, the print data included in the received print request is printed without being stored in the memories.

10 Claims, 19 Drawing Sheets

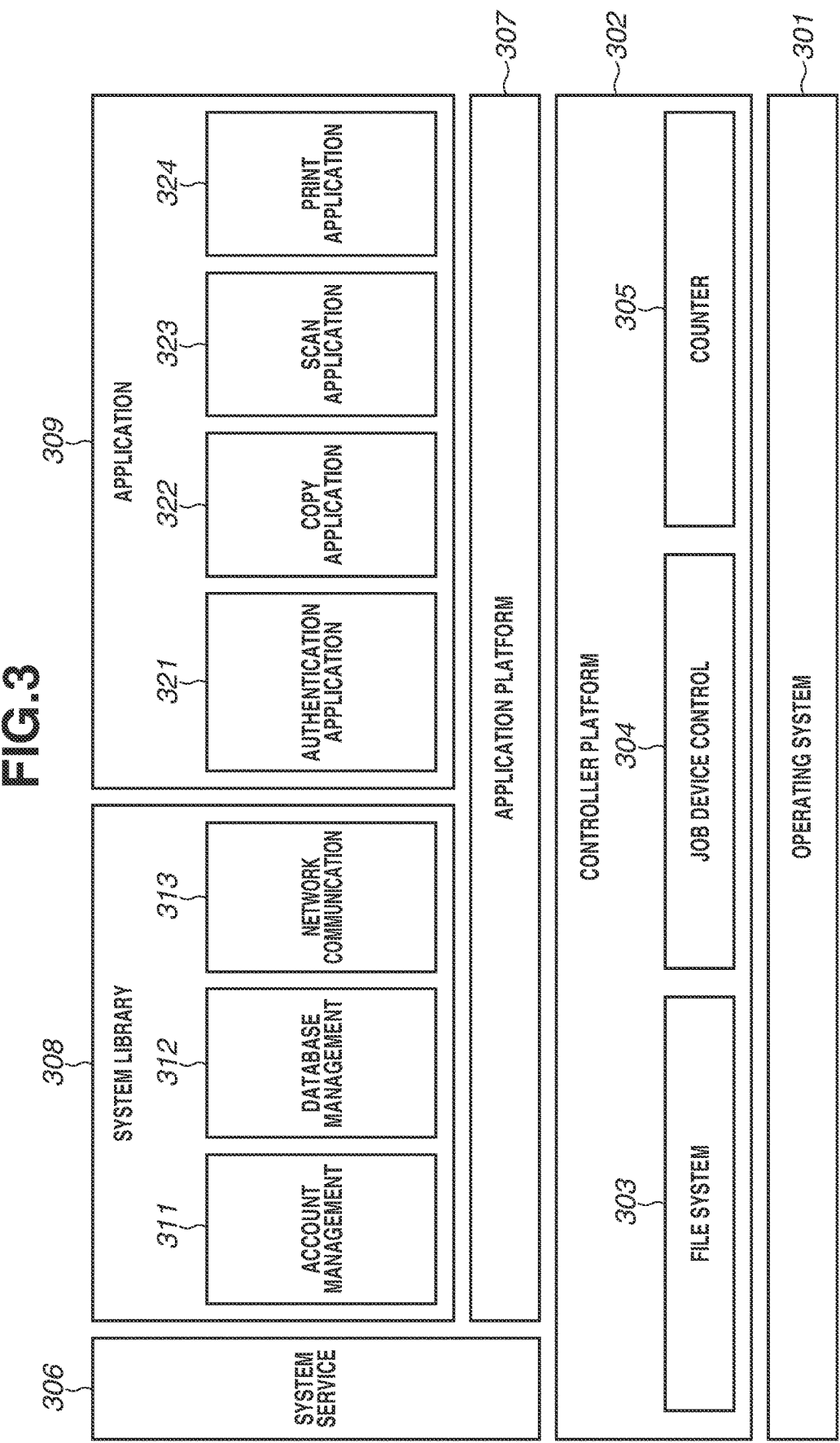

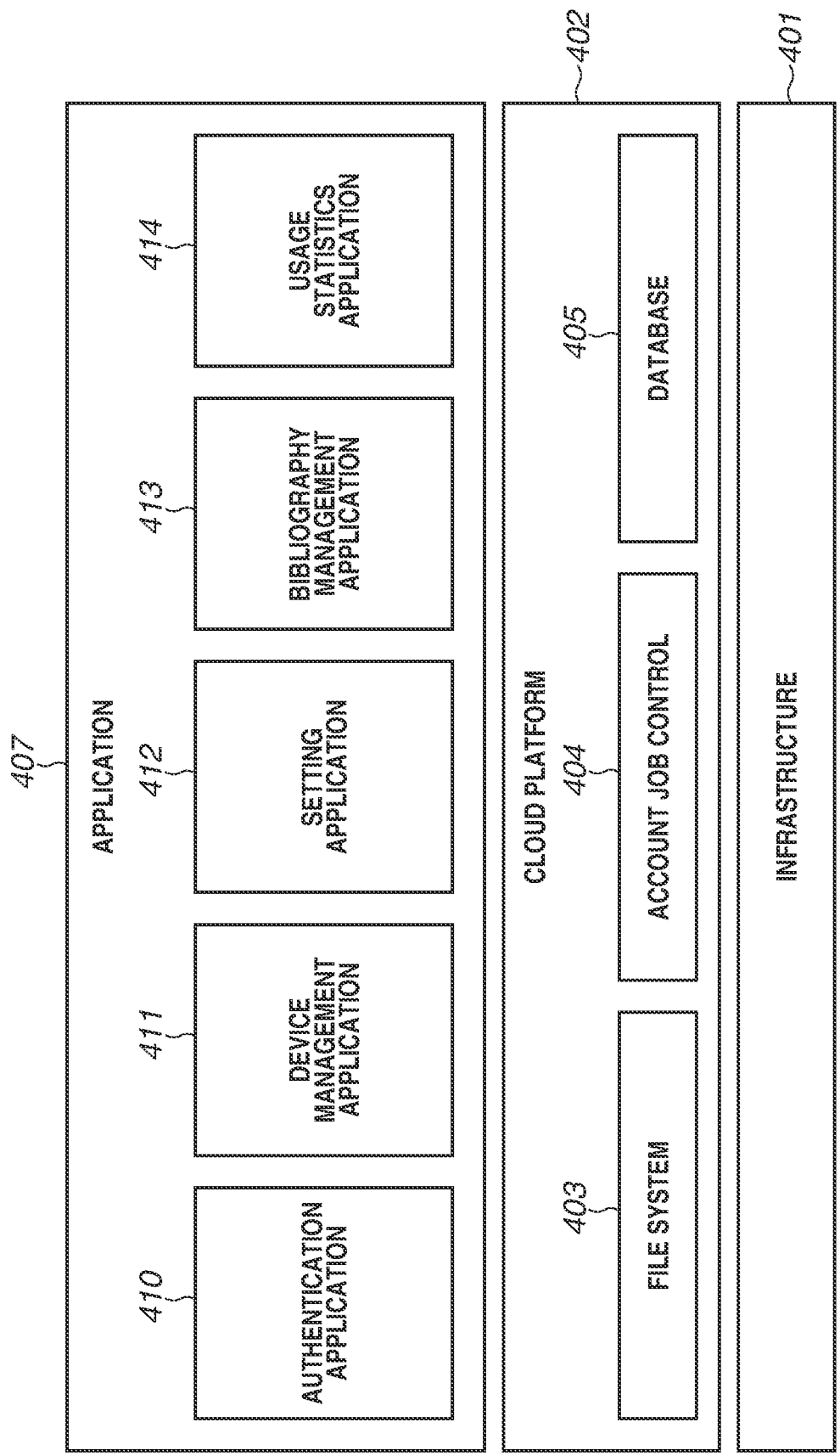

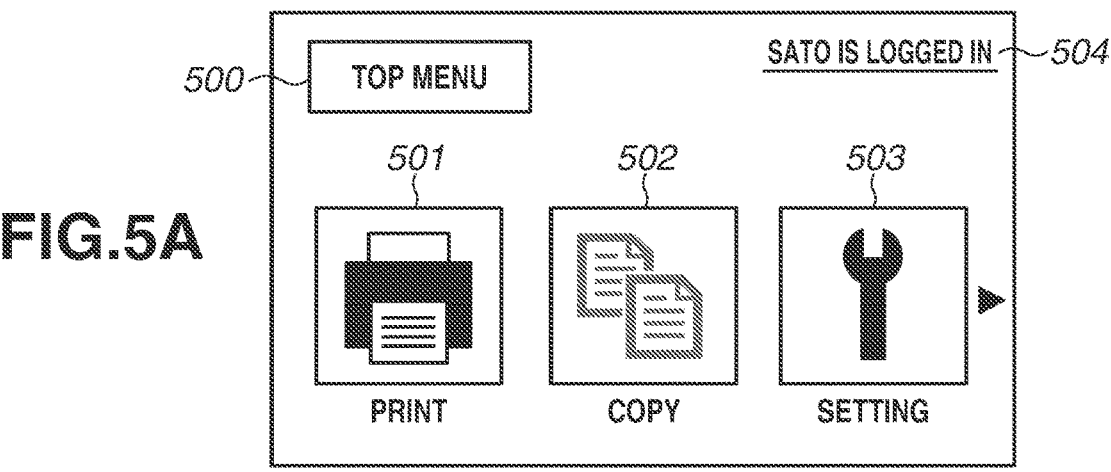

FIG.7

| USER NAME | JOB ID | RECEPTION DATE AND TIME | STORAGE LOCATION | | JOB NAME | PRINT SETTING | | | | | |
|---|---|---|---|---|---|---|---|---|---|---|---|
| | | | IP ADDRESS | PATH | | COLOR | SIZE | NUMBER OF PRINTS | TWO-SIDED | STAPLING | PUNCHING |
| SATO | 1 | 2019.05.14 15:05 | 192.168.0.1 | /printdata/1data.prn | index.html | BW | A4 | 3 | ONE-SIDED | NO STAPLING | TWO HOLES |
| | 2 | 2019.05.14 17:21 | 192.168.0.2 | /printdata/2data.prn | Meeting.docx | CL | A3 | 1 | TWO-SIDED | UPPER LEFT SINGLE STAPLING | NO PUNCHING |

| | |
|---|---|
| JOB START COMMAND | ~801 |
| JOB START PARAMETER<br>    JOB ID<br>    JOB NAME<br>    USER NAME<br>    DOMAIN NAME | ~802 |
| JOB SETTING START COMMAND | ~803 |
| JOB SETTING PARAMETER<br>    COLOR<br>    NUMBER OF PRINTS<br>    ONE-SIDED/TWO-SIDED<br>    SHEET SIZE | ~804 |
| JOB SETTING END COMMAND | ~805 |
| DRAWING DATA START COMMAND | ~806 |
| DRAWING DATA<br>    PAGE START<br>    DRAWING OF TEXT, FIGURE, AND IMAGE<br>    PAGE END | ~807 |
| DRAWING DATA END COMMAND | ~808 |
| JOB FINISHING START COMMAND | ~809 |
| JOB FINISHING PARAMETER<br>    NUMBER OF PUNCH HOLES<br>    BOOKBINDING DESIGNATION<br>    STAPLING DESIGNATION<br>    DISCHARGE DESTINATION DESIGNATION | ~810 |
| JOB FINISHING END COMMAND | ~811 |
| JOB END COMMAND | ~812 |

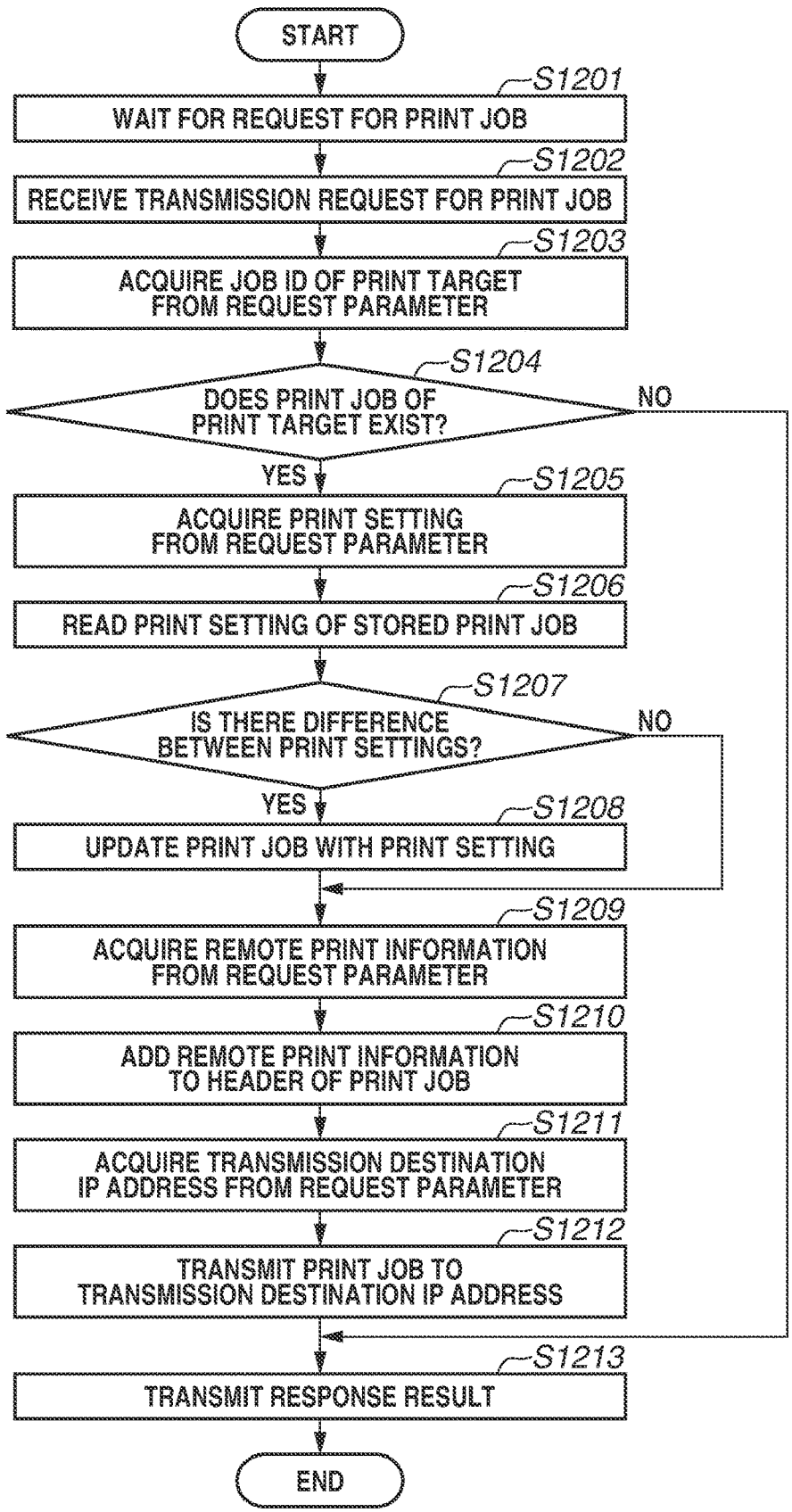

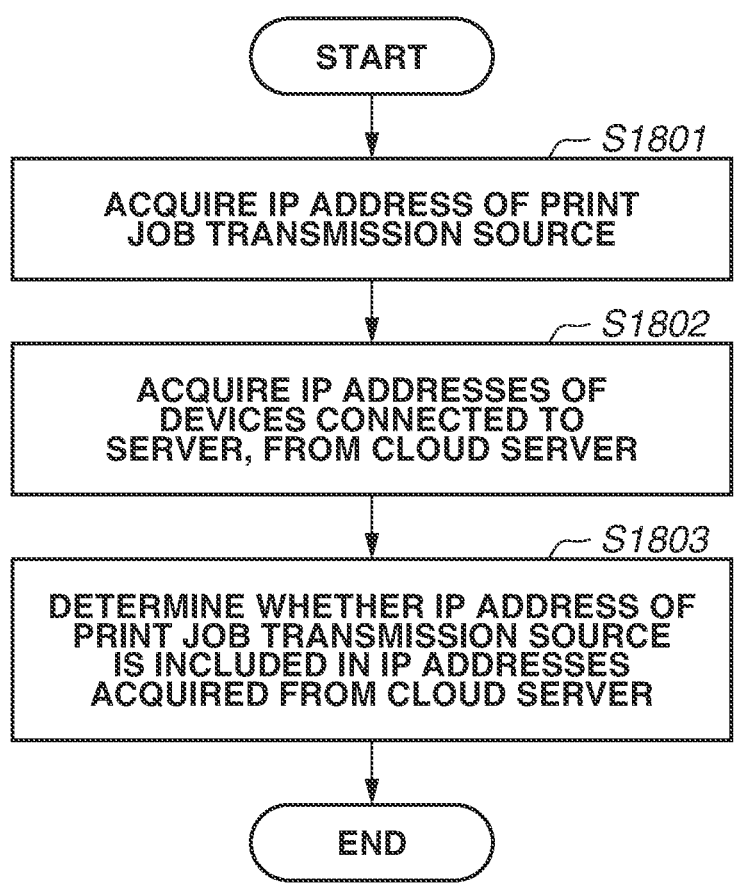

PRINTING APPARATUS, PRINTING SYSTEM, CONTROL METHOD, AND STORAGE MEDIUM

BACKGROUND OF THE INVENTION

Field of the Invention

The present disclosure relates to a printing apparatus, a printing system, a control method, and a storage medium.

Description of the Related Art

When a conventional multifunction peripheral (MFP) receives print data from a terminal apparatus such as a personal computer (PC), the MFP instantly performs printing. In such a case, if a printed document is left without being picked up and a third party sees the left printed document, information leakage can occur. In view of the foregoing, recently, hold printing has been proposed for confidentiality reasons. In the hold printing, an MFP temporarily stores print data into a nonvolatile storage region of the MFP instead of instantly performing printing upon receiving the print data. Then, if a user issues a print execution instruction on an operation panel of the MFP, the MFP outputs the print data.

In recent years, an MFP (output device) that outputs print data is not limited to an MFP (document reception device) that has received the print data. More specifically, Japanese Patent Application Laid-Open No. 2010-211627 discusses remote print in which an MFP can acquire print data held in a different MFP and print the acquired print data.

In the above-described remote print, upon receiving a print execution instruction issued by the user on an operation panel of an output device, the output device receives print data from a document reception device storing the print data and executes printing. At this time, if a hold setting of storing print data into a storage unit in a device until a print execution instruction is issued by the user is set in the output device, the print data received from the document reception device is temporarily held in the output device. Consequently, it takes time until printing is started in the output device.

SUMMARY OF THE INVENTION

According to an aspect of the present invention, a printing apparatus includes one or more memories, and one or more processors that execute a set of instructions to transmit information for identifying print data to a different printing apparatus, receive a print request including print data, store the print data included in the received print request in the memories, and print data, wherein, in a case where the received print request is a print request transmitted from the different printing apparatus, the print data included in the received print request is printed without being stored in the memories.

Further features of the present invention will become apparent from the following description of exemplary embodiments with reference to the attached drawings.

BRIEF DESCRIPTION OF THE DRAWINGS

FIG. 3 is a block diagram illustrating a software configuration of the MFP.

FIG. 4 is a block diagram illustrating a software configuration of a cloud server.

FIGS. 5A, 5B, and 5C each illustrate an example of a screen to be displayed on an operation unit by a print application of the MFP.

FIG. 7 is a table illustrating content of bibliographic information stored in the cloud server.

FIG. 8 is a diagram illustrating a data configuration of a print job to be stored in a MFP (document reception device).

FIG. 12 is a flowchart illustrating an example of a processing procedure of a request response to a print job of an MFP (document reception device) according to the first exemplary embodiment.

FIG. 18 is a flowchart illustrating an example of a remote print determination processing procedure of the MFP according to the third exemplary embodiment.

DESCRIPTION OF THE EMBODIMENTS

Hereinafter, exemplary embodiments of the present disclosure will be described with reference to the drawings.
<Network Configuration of Remote Printing System>

Figure 1:
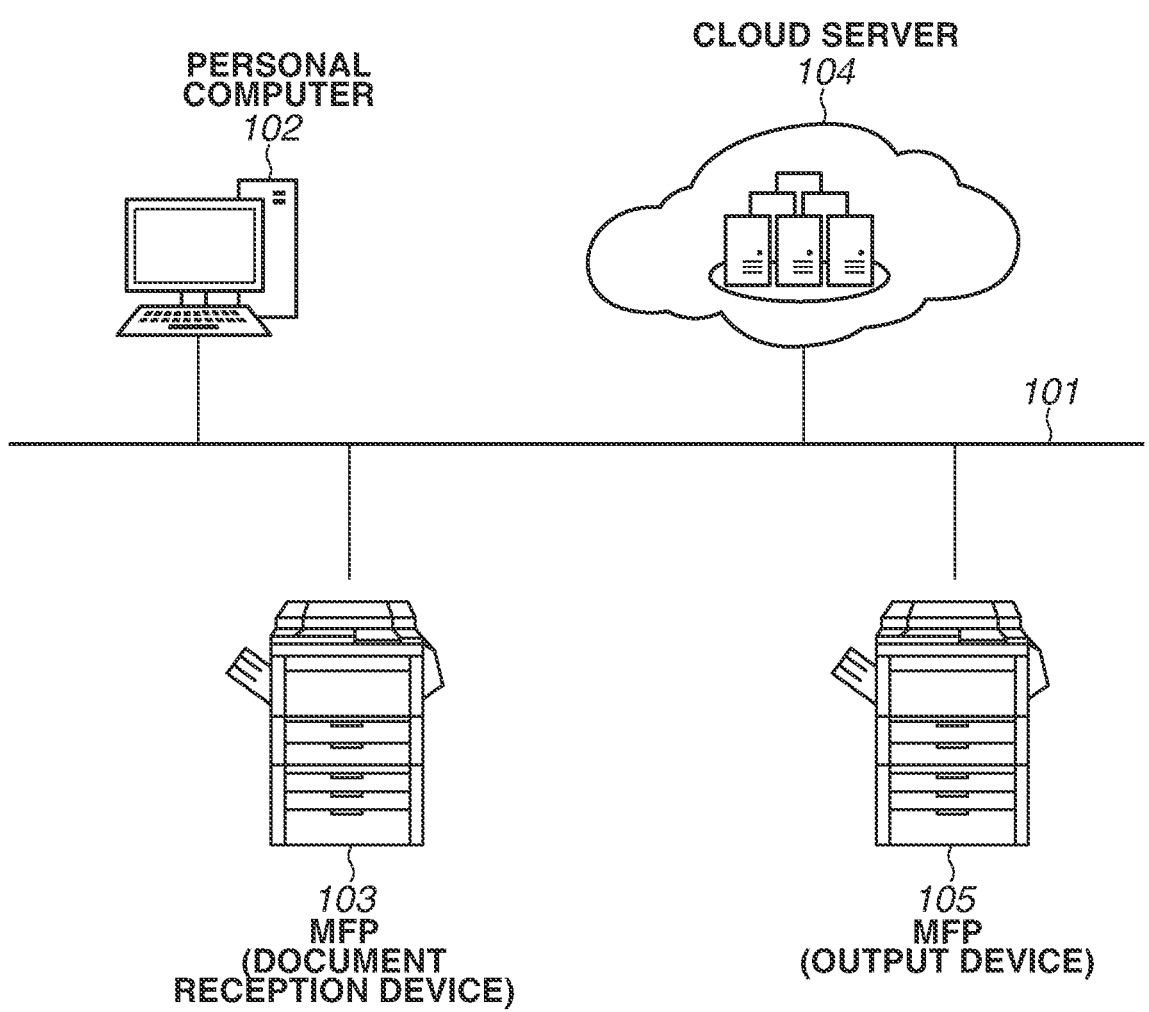
FIG. 1 is a diagram illustrating a network configuration of a remote printing system.

FIG. 1 is a diagram illustrating a network configuration to which a multifunction peripheral (MFP) serving as an image forming apparatus according to a first exemplary embodiment of the present disclosure and a cloud server serving as an information processing apparatus are applicable. In FIG. 1, a network 101 supports Transmission Control Protocol/Internet Protocol (TCP/IP), for example. A personal computer 102 serving as an information processing apparatus, a cloud server 104, and MFPs 103 and 105 are connected to the network 101.

The MFP 103 is a document reception device that stores a print job upon receiving the print job from the personal computer 102 when a remote print function is used. The MFP 103 creates bibliographic information from the received print job, and transmits the bibliographic information to the cloud server 104.

The cloud server 104 centrally manages the bibliographic information of print jobs stored in all MFPs registered on the same network 101. As an information processing apparatus for managing the bibliographic information, a configuration in which the MFP 103 or 105 manages the bibliographic information is also considered. However, there are three advantages in allowing the cloud server 104 to manage the bibliographic information:

response performance can be maintained even when processing load is concentrated;

an upper limit of manageable amount of bibliographic information can be easily extended; and a downtime can be reduced as a bibliography management server.

In a case where the MFP manages the bibliographic information, since the MFP has functions such as copy and scan, if the functions operate simultaneously with a management function of the bibliographic information or if requests for the bibliographic information management function concentrate on a server, response performance of bibliographic information management can decline.

In addition, if the MFP is used as the bibliography management server, because resources of permanent storage capacity such as a hard disk are finite, extensibility of an upper limit of manageable amount of bibliographic information is low.

Furthermore, if the MFP is used as the bibliography management server, because the MFP is sometimes turned off, the downtime as the bibliography management server can be generated.

These issues can be solved by the cloud server managing the bibliographic information.

The MFP 105 receives authentication information from a user and performs authentication. The MFP 105 is an output device that acquires the bibliographic information from the cloud server 104 based on the authentication information after the user is authenticated, receives a print job from the MFP (document reception device) 103 based on the acquired bibliographic information, and performs printing.

A typical configuration has been described above for the sake of explanatory convenience, and it is also possible to provide a plurality of personal computers 102, a plurality of MFPs 103, or a plurality of MFPs 105.

In addition, each of the MFPs 103 and 105 operates as both the document reception device and the output device. In other words, all MFPs registered in the system each operate as both the document reception device and the output device. The MFPs 103 and 105 may be printers 103 and 105 that only have a print function and do not have multiple functions such as scan and copy functions.

<Schematic Configuration of MFPs 103 and 105>

Figure 2:
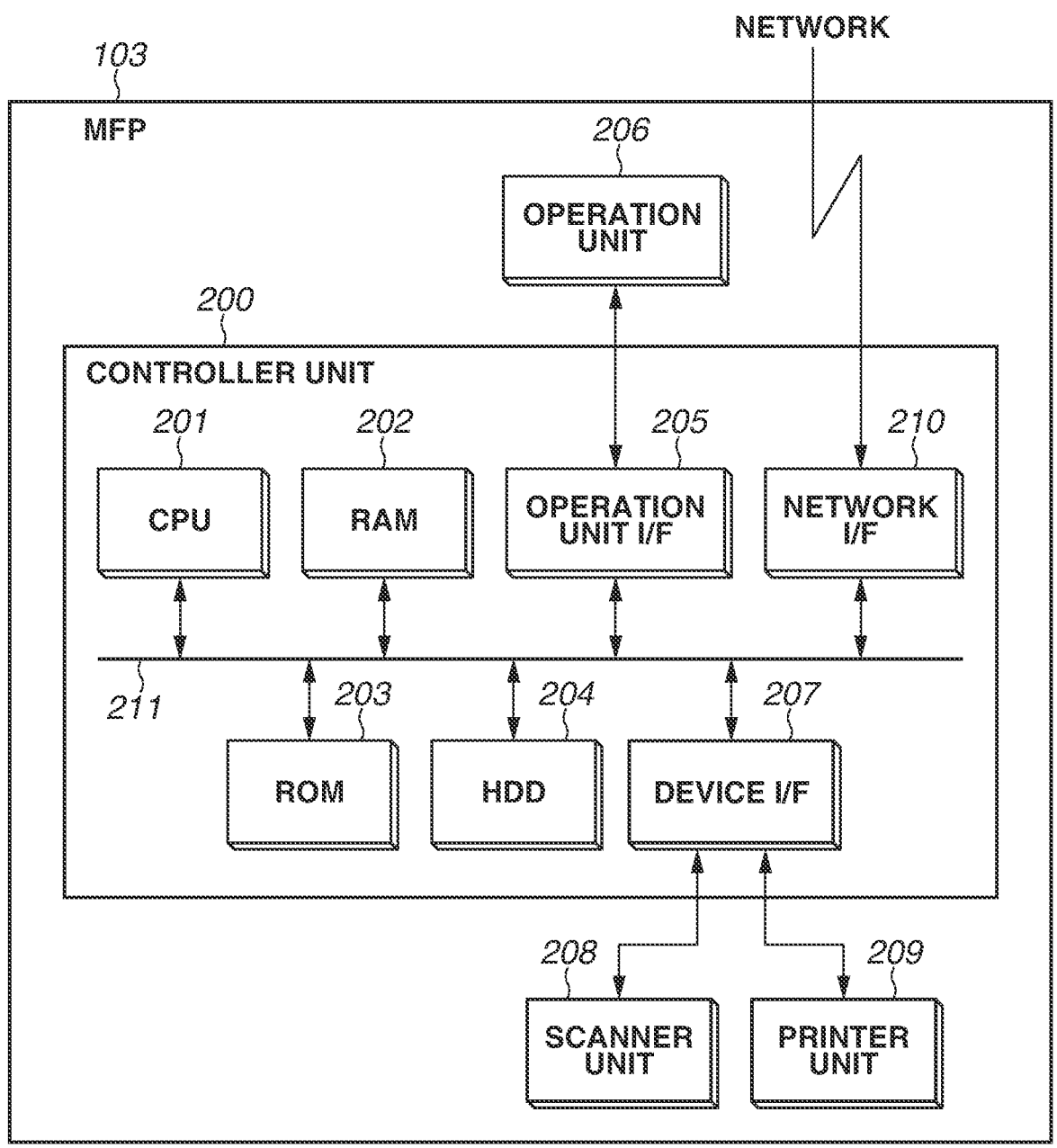
FIG. 2 is a block diagram schematically illustrating a configuration of a multifunction peripheral (MFP).

FIG. 2 is a block diagram schematically illustrating a configuration of the MFPs 103 and 105 according to the exemplary embodiment of the present disclosure. FIG. 2 illustrates the configuration of the MFP 103 for the sake of simplification.

In FIG. 2, the MFP 103 includes a controller unit 200, an operation unit 206, a scanner unit 208, and a printer unit 209.

The controller unit 200 is a device that controls an MFP or a printer. The controller unit 200 includes a central processing unit (CPU) 201, a random access memory (RAM) 202, a read-only memory (ROM) 203, a hard disk drive (HDD) 204, an operation unit interface (I/F) 205, a device I/F 207, and a network I/F 210. These components are connected via a system bus 211.

The CPU 201 comprehensively controls each device connected to the system bus 211, and controls the entire MFP (image forming apparatus) 103. The RAM 202 stores programs and data such as an operating system, system software, and application software. The ROM 203 stores a boot program of a system, a system program, and an application program. Furthermore, the ROM 203 sometimes stores information necessary for the image forming apparatus such as a font. The HDD 204 is a hard disk drive and stores an operating system, system software, application software, image data, setting data, and a print job. The programs stored in the RAM 202 is executed by the CPU 201 to process image data and data other than the image data that are stored in the RAM 202, the ROM 203, and the HDD 204. In some cases, a compact MFP is not equipped with the HDD 204 and stores the system software and application software into the ROM 203. Alternatively, a storage device other than a hard disk drive such as a flash memory including a solid state drive (SSD) may be used in place of the HDD 204.

The operation unit I/F 205 is an interface unit with the operation unit 206 including a touch panel, and outputs, to the operation unit 206, image data to be displayed on the operation unit 206. In addition, the operation unit I/F 205 conveys information input by the user on the operation unit 206 to the CPU 201.

The device I/F 207 connects the scanner unit 208 and the printer unit 209 serving as an image input device and an image output device, respectively, with the controller unit 200 to perform input and output of image data. The image data input from the scanner unit 208 via the device I/F 207 is stored into the RAM 202 or the HDD 204. As necessary, the stored image data is subjected to image processing executed by an application program stored in the RAM 202. In addition, the image data is output to the printer unit 209 via the device I/F 207. The network I/F 210 connects to a network, and performs input and output of image data held by an external device on the network or information for controlling the MFP.

The components of the MFP 103 are not limited to the components illustrated in FIG. 2, and components not illustrated in FIG. 2 may be included as long as an effect of the present disclosure can be obtained. For example, in a case where an MFP has a FAX function, the controller unit 200 can be equipped with an I/F for a modem device (not illustrated in FIG. 2), so that the MFP can connect to a public network using a modem and perform FAX transmission. Alternatively, for example, the controller unit 200 can be equipped with a universal serial bus (USB) I/F (not illustrated), so that the MFP can read and print data stored in a flash memory card.

<Software Configuration of MFPs 103 and 105>

FIG. 3 is a block diagram illustrating a software configuration of the MFPs 103 and 105 according to the exemplary embodiment of the present disclosure. Software modules illustrated in FIG. 3 are installed in the controller unit 200. Software built in an MFP or a printer and to be processed by the controller unit 200 is installed as so-called firmware and is executed by the CPU 201.

An operating system 301 provides software operating thereon with a service and a framework of various types of resource management that are optimized for controlling a built-in system. The service and the framework of resource management provided by the operating system 301 include multitask management and inter-task communication. The multitask management operates a plurality of processes substantially concurrently by managing a plurality of execution contexts of processing to be performed by the CPU 201. The inter-task communication implements synchronization and data exchange between tasks. The operating system 301 also provides memory management, interrupt management, various device drivers, a local interface, and a protocol stack that implements processing of various protocols of a network and communication.

A controller platform 302 includes a file system 303, a job device control 304, and a counter 305. The file system 303 is a mechanism for storing data that is constructed on a storage device such as the HDD 204 or the RAM 202, and is used for spooling a job to be handled by the controller unit 200 or for storing various types of data. The job device control 304 controls hardware of an MFP or a printer and also controls a job that uses a basic function (e.g., print, scan, communication, image conversion, etc.) provided mainly by the hardware. The counter 305 manages an expiration date of each application and a counter value based on a usage record of print or scan.

A system service 306 is a module for monitoring an operational status of an MFP or a printer and for downloading software and a license from a software delivery server via a network.

An application platform 307 is middleware for enabling the mechanisms of the operating system 301 and the controller platform 302 to be used from a system library 308 and applications 309, which will be described below.

The system library 308 is a software module that provides services and functions that can be used from the applications 309, and include an account management 311, a database management 312, and a network communication 313.

The applications 309 are software modules that can display a menu on the operation unit 206 and receive an input from the user, and provides the user with various functions to be implemented by an MFP or a printer.

An authentication application 321 is one of the applications 309, and manages a user who can use the MFP 103 or 105 using the account management 311 in the system library 308. Using the network communication 313, the account management 311 performs user authentication by communicating with an authentication application 410 of the cloud server 104, which will be described below. The account management 311 performs the user authentication by checking a user name and a password input via the operation unit 206 by communicating with the authentication application 410.

A copy application 322 is one of the applications 309, and accesses the job device control 304 via the application platform 307 to provide a copy function of a paper document.

A scan application 323 is one of the applications 309, and accesses the job device control 304 via the application platform 307 to provide a function of scanning a paper document and storing digital data of the paper document.

A print application 324 is one of the applications 309. When a remote print function is enabled, the print application 324 holds a received print job, creates bibliographic information from the print job, and transmits a registration request to the cloud server 104.

The print application 324 communicates with the cloud server 104 using the network communication 313, and performs display of a print queue and setting change or deletion based on the acquired bibliographic information.

The print application 324 connects with a different MFP 103 or 105 using the network communication 313, and provides a remote print function of performing printing after storing an acquired print job in the HDD 204.

The print application 324 accesses the job device control 304 via the application platform 307, and provides a function of outputting the print job stored in the HDD 204.

<Software Configuration of Cloud Server 104>

FIG. 4 is a block diagram illustrating a software configuration of the cloud server 104 according to the exemplary embodiment of the present disclosure. Software modules illustrated in FIG. 4 are installed in the cloud server 104.

An infrastructure 401 is an infrastructure for the cloud server 104 to provide a service, and includes a server, a virtual machine, a storage, a network, and an operating system.

A cloud platform 402 is a framework that provides common basic functions to applications 407 using the infrastructure 401, and includes a file system 403, an account job control 404, and a database 405.

The applications 407 can communicate with a web browser operating in the personal computer (information processing apparatus) 102, display a menu on a web browser screen of the personal computer (information processing apparatus) 102, and receive an input from the user. The applications 407 are software modules that manage a user account of a user who can use an MFP or a printer, visualize usage statistics of an MFP or a printer, and provide the user with various functions that use an MFP or a printer.

The authentication application 410 is one of the applications 407. Using the account job control 404 in the cloud platform 402, the authentication application 410 manages a user who can use the MFP 103 or 105. The authentication application 410 receives, via a network, user information requested to be authenticated by the authentication application 321 of the MFP 103 or 105, and checks a user name and a password. Instead of using the account job control 404 in the cloud platform 402 for user authentication, an external authentication server such as an Active Directory or a Lightweight Directory Access Protocol (LDAP) may be used for user authentication.

A device management application 411 is one of the applications 407, and performs device management such as registration, edit, or deletion of the MFP 103 or 105 to be connected.

A setting application 412 is one of the applications 407, and performs a setting of a function to be provided to the user in the cloud server 104.

A bibliography management application 413 is one of the applications 407, and manages bibliographic information printable on the MFP 103 or 105 registered by the device management application 411 for each user registered by the authentication application 410. The bibliographic information is management information about a print job input to an MFP, and includes a job ID and reception date and time of the print job, an Internet Protocol (IP) address and a directory path of an MFP storing the print job, a job name, and a print setting.

A usage statistics application 414 is one of the applications 407, and displays statistics information about a usage record of a function such as a print function or a scan function. As a display method of the statistics information, the statistics information is displayed on a web browser screen of the personal computer (information processing apparatus) 102 for each of the MFPs 103 and 105 registered by the device management application 411 or for each user registered by the authentication application 410.

<Top Menu Screen of MFP>

FIG. 5A illustrates an example of a top menu screen on the MFP 105 serving as an output device according to the exemplary embodiment. The screen is displayed on the operation unit 206 of the MFP 105.

When a user logs into the MFP 105 using an IC card, after the login, a top menu 500 is displayed. On the top menu 500, the user can select an application to use on the MFP 105. Since the user has logged in to the MFP 105, a login user name 504 is displayed on the screen. FIG. 5A illustrates a screen example displayed when a user with a user name "Sato" has logged in.

Icons of the applications 309 installed in the MFP 105 are displayed on the top menu 500. A print icon 501 is an icon of the print application 324. If the print icon 501 is pressed, the print application 324 is activated.

A copy icon 502 is an icon of the copy application 322. If the copy icon 502 is pressed, the copy application 322 is activated.

A setting icon 503 is an icon of an application that is one of the applications 309 and that performs a setting related to the MFP 105.

<Description of Print Queue Display Screen>

FIG. 5B illustrates an example of a print queue display screen displayed on the MFP 105 serving as an output device according to the exemplary embodiment. The screen is displayed on the operation unit 206 by the print application 324 executed by the CPU 201 of the MFP 105. A list of print jobs owned by the authenticated user is displayed on the print queue display screen.

FIG. 5B illustrates a print queue display screen 510 of the print application 324 that is displayed by a press of the print icon 501. FIG. 5B illustrates a screen example displayed when a user with a user name "Sato" has logged in. A job name 511, a color/monochrome setting 512, a sheet size 513, and the number of prints 514 are displayed for each print job. There are two print jobs 515 and 516 operable on the screen. The print application 324 acquires bibliographic information about "Sato" who is the login user from the cloud server 104 that manages bibliographic information, and displays the bibliographic information in an area of the print queue display screen 510. For the print jobs, a print button 518, a delete button 519, and a print setting button 520 are displayed. By selecting a desired print job from among the displayed print jobs and pressing any of the buttons, the user can perform a corresponding operation on the selected print job. A login user name 517 indicates a name of a user who has logged in. If an update button 521 is pressed, the print application 324 of the MFP 105 reacquires the bibliographic information about "Sato" who is the login user from the cloud server 104, and updates a list display of print jobs based on the acquired bibliographic information.

<Description of Setting Change Screen>

FIG. 5C is a print setting screen to be displayed by a press of the print setting button 520. An operation of changing a print setting of the print job selected on the print queue display screen 510, an operation of updating the print setting, and an operation of performing printing can be performed. Current setting values are displayed in a setting 550 of two-sided printing, a setting 551 of a color mode, a setting 552 of stapling, a setting 553 of punching, a setting 554 of the number of prints, and a setting 555 of a sheet size. From among the settings, the user can select a print setting desired to be changed and change the setting value thereof. Even if the print setting is changed, the change made to the print setting is cancelled if a return button 556 is pressed. If a setting update button 558 is pressed after the user changes the setting value, the print application 324 updates the bibliographic information with the changed print setting, and requests the cloud server 104 to update the bibliographic information. If a print button 559 is pressed after the user changes the setting value, the print application 324 prints the target print job using the changed print setting. Then, the print application 324 updates the bibliographic information with the changed print setting, and requests the cloud server 104 to update the bibliographic information.

<Description of Device Management Screen of Cloud Server>

Figure 6A:
FIGS. 6A and 6B each illustrate an example of a screen to be displayed on a browser by a setting application of the cloud server.
Figure 6B:
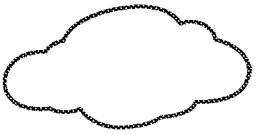

FIGS. 6A and 6B each illustrate an example of a setting screen of various functions provided by the cloud server 104 according to the exemplary embodiment. The screen to be displayed is generated by each of the applications 407 of the cloud server 104, and the functions thereof are provided. The screen is displayed on a web browser operating in the personal computer (information processing apparatus) 102 by the web browser of the personal computer (information processing apparatus) 102 communicating with the cloud server 104.

FIG. 6A illustrates a device management display screen of the device management application 411 displayed by clicking on a device tab 620. A list of MFPs or printers that provide functions of the cloud server 104 is displayed as devices 624. A device addition button 621, a device edit button 622, and a device deletion button 623 are displayed. To add or delete an MFP or a printer that provides functions in a cloud server, the user presses the device addition button 621 or the device deletion button 623. To edit information (IP address or location) regarding a registered device, the user presses the device edit button 622. The cloud server provides each of the registered devices with functions such as authentication of a user who can use the device, visualization of statistics about a usage record of printing and scan in each device, and remote print.

<Description of Advanced Function Screen of Cloud Server>

FIG. 6B illustrates a setting screen of an advanced function to be displayed by clicking an advanced function tab 600. Remote print, which is one of advanced functions, can be selected thereon, and a setting related to the remote print can be performed. The setting application 412 operating in the cloud server 104 creates a screen of a setting 601 of remote print. The user selects one from among three settings described below as a setting value to be applied.

If a setting "immediately execute all print jobs" 602 is selected, all the devices 624 registered by the device management application 411 immediately perform printing upon receiving print jobs without holding the print jobs. Thus, a setting that does not allow use of the remote print is set.

If a setting "hold a print job in a PC application" 606 is selected, a print application preinstalled on the personal computer (information processing apparatus) 102 holds a print job in an HDD in the information processing apparatus upon receiving the print job. Bibliographic information about the held print job is created, and the bibliography management application 413 of the cloud server 104 is requested to add the bibliographic information. A list of bibliographic information of all devices on the same network is acquired from the bibliography management application 413 of the cloud server 104, so that a setting that allows the use of the remote print is set. In such a configuration, the information processing apparatus holding the print job needs to be in an operating state at the time of remote print execution.

If a setting "hold a print job in a device" 603 is selected, all the devices 624 registered by the device management application 411 each hold a print job in the HDD 204 in each of the devices upon receiving the print job. Bibliographic information of the held print job is created, and the bibliography management application 413 of the cloud server 104 is requested to add the bibliographic information. The setting that allows the use of the remote print is set in a device other than a device that has received the print job by acquiring the list of bibliographic information from the bibliography management application 413 of the cloud server 104.

If the setting "hold a print job in a PC application" 606 or the setting "hold a print job in a device" 603 is selected, a storage period 604 of the print job becomes settable. A print application on the personal computer (information processing apparatus) 102 that holds the print job or the print application 324 on each of the registered devices 624 stores the print job for a time period set in the storage period 604 of the print job from when the print job is received. When the storage period 604 of the print job elapses, the print job is deleted.

If a store button 605 is clicked, the setting value for the remote print is stored, and a setting change is applied.

<Content of Bibliographic Information>

FIG. 7 is a table illustrating an example of content of bibliographic information managed for each user by the bibliography management application 413 of the cloud server 104.

FIG. 7 illustrates an example of the bibliographic information managed by the bibliography management application 413, and illustrates bibliographic information 700 of two print jobs. The bibliographic information 700 is generated by the MFP (document reception device) 103 that has received a print job, transmitted to the bibliography management application 413 of the cloud server 104, and is managed by the bibliography management application 413. More specifically, the bibliographic information 700 regarding all print jobs held in devices registered by the device management application 411 of the cloud server 104 is managed by the bibliography management application 413 of the cloud server 104.

The bibliographic information 700 includes a user name 701, a job ID 702, a reception date and time 703, a storage location (IP address, directory path) 704, and a print setting (job name, color, sheet size, the number of prints, two-sided, stapling, punching) 705. In the example, the bibliographic information 700 of the user with the user name 701 "Sato" is illustrated. The reception date and time 703 is information indicating a date and time of reception of the print job by the MFP. The IP address in the storage location 704 indicates an IP address of the MFP storing the print job. The directory path in the storage location 704 indicates a path of a directory in the HDD 204 of the MFP in which the print job is stored. In other words, the storage location 704 corresponds to information for identifying a storage location of the print job. The print setting 705 is set by an application on the personal computer (information processing apparatus) 102 via a printer driver. Alternatively, the print setting is changed by the print application 324 of the MFP. A setting other than the print setting illustrated in FIG. 7 can also be stored as the bibliographic information 700. In addition, the bibliographic information 700 can also be provided with a printed flag (not illustrated in FIG. 7) that indicates whether each print job has already been printed.

<Content of Print Job>

FIG. 8 is a diagram illustrating an example of content of a data configuration of a print job to be stored in the MFP 103 serving as a document reception device.

FIG. 8 illustrates an example of a print job stored in the HDD 204 in the MFP serving as a document reception device, and illustrates a data structure of one print job 800. The print job 800 is created by a printer driver operating in the personal computer (information processing apparatus) 102.

A job start command 801 is arranged at the beginning of the print job, and indicates that the job of the data starts from this point.

A job start parameter 802 includes a job ID being an identifier of the print job, a job name of the print job, a user name of a user who owns the print job, and a domain name to which the user who owns the print job belongs, and pieces of information belonging to the print job are arranged.

A job setting start command 803 is arranged at the beginning of job setting information, and indicates that a job setting of the data starts from this point.

A job setting parameter 804 indicates a print setting of the print job, and setting information of a color setting, the number of prints designation, a one-sided/two-sided setting, and sheet size designation is arranged.

A job setting end command 805 is arranged at the end of the job setting information, and indicates that the job setting of the data ends at this point.

A drawing data start command 806 is arranged at the beginning of page-description language (PDL) data describing drawing information about a printout document, and indicates that drawing data starts from this point.

The PDL data is arranged in drawing data 807. The drawing data 807 includes a page start command, the designation of an object (text, figure, image) to be drawn in a page, and a page end command. Information to be drawn in the print job is arranged in the drawing data 807.

A drawing data end command 808 is arranged at the end of the PDL data describing drawing information about the printout document, and indicates the end of the drawing data.

A job finishing start command 809 is arranged at the beginning of job finishing setting information, and indicates that a job finishing setting of the data starts from this point.

A job finishing parameter 810 indicates a finishing setting of the print job. Setting information about the number of punch holes, bookbinding designation, stapling designation, and discharge destination designation is arranged.

A job finishing end command 811 is arranged at the end of the job finishing setting information, and indicates that the job finishing setting of the data ends at this point.

A job end command 812 is arranged at the end of the job, and indicates that the job of the data ends at this point.

<Setting Procedure of Remote Print>

Figure 9A:
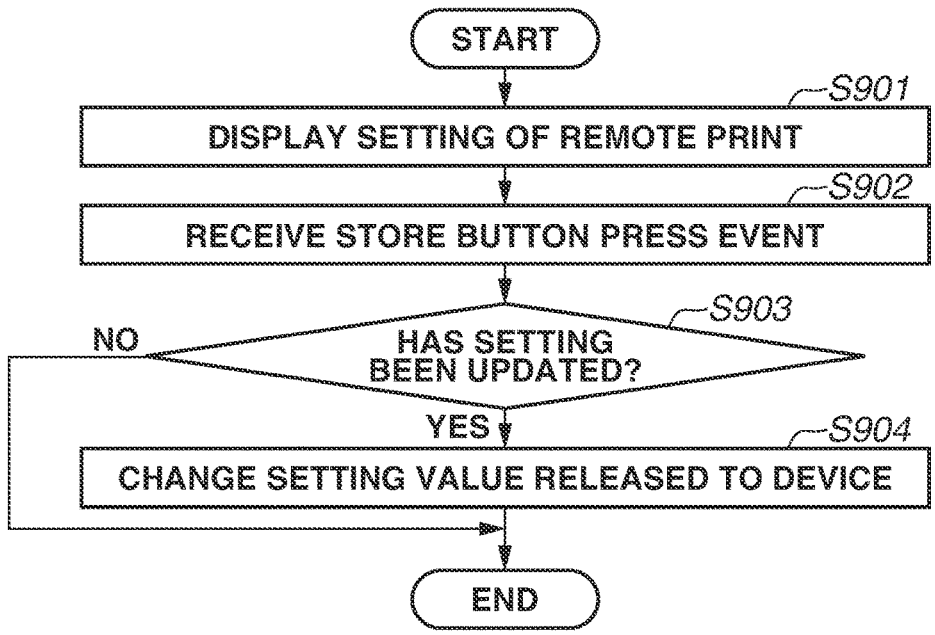
FIGS. 9A and 9B are flowcharts illustrating an example of a setting procedure of the cloud server and a setting procedure of the MFP.
Figure 9B:
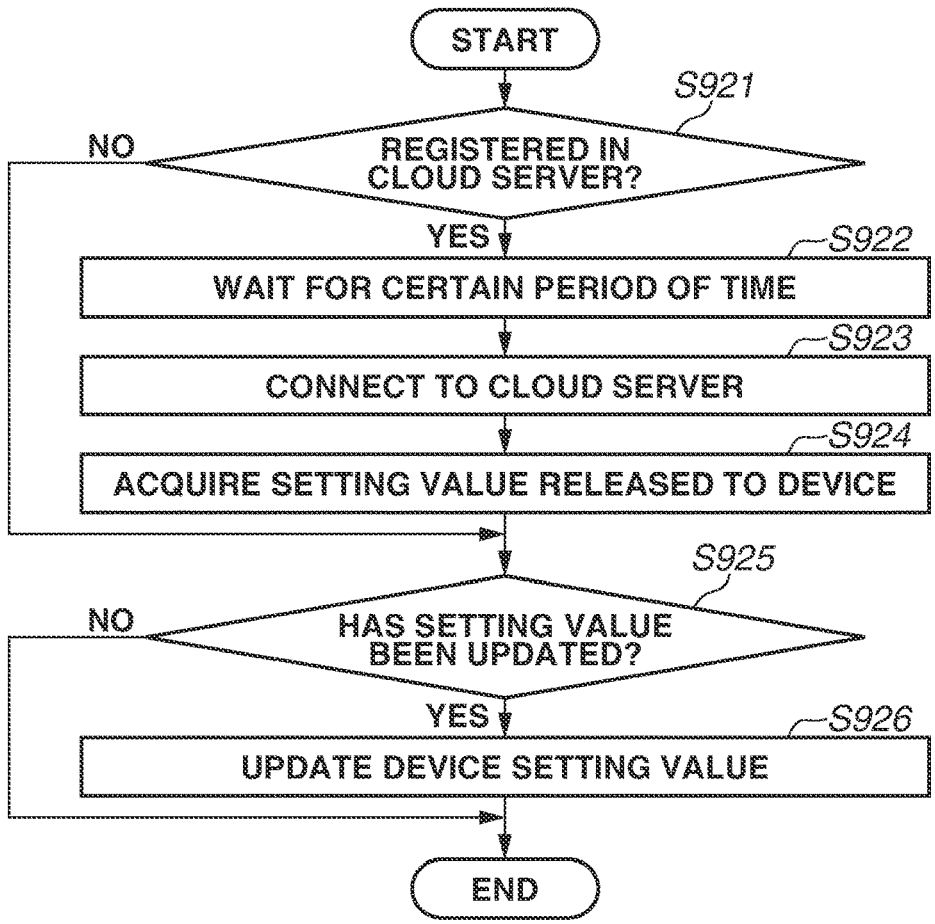

FIGS. 9A and 9B are flowcharts illustrating an example of a setting procedure of remote print in the cloud server 104 and a setting procedure of remote print in the MFPs 103 and 105 according to the exemplary embodiment of the present disclosure.

First, in step S901, the setting application 412 operating in the cloud server 104 displays a setting of remote print on a web browser of the personal computer (information processing apparatus) 102.

In step S902, the setting application 412 receives, from the web browser of the personal computer (information processing apparatus) 102, an event indicating that the store button 605 has been pressed.

In step S903, the setting application 412 acquires a setting value of remote print that has been set by the user from the web browser of the personal computer (information processing apparatus) 102, and determines whether the acquired setting value has been updated from when the store button 605 has been previously pressed. If the setting value has not been updated (NO in step S903), a series of processes ends.

It is checked whether the setting "hold a print job in a device" 603 is enabled or disabled as the setting value of remote print. If the setting "hold a print job in a device" 603 is enabled, the setting value includes the storage period 604 of a print job.

In step S903, if it is determined that the setting value of remote print has been updated or if a setting is performed for the first time (YES in step S903), the processing proceeds to step S904. In step S904, the setting application 412 updates a setting value released to the registered devices and ends a series of processes.

First, in step S921, the print application 324 operating in each of the MFPs 103 and 105 checks whether the MFP is registered in the cloud server 104. If the MFP is registered (YES in step S921), the processing proceeds to step S922. If the MFP is not registered (NO in step S921), the processing proceeds to step S925.

In step S922, the print application 324 enters a state of waiting for a certain period of time. After a lapse of the certain period of time such as 15 minutes, the processing proceeds to step S923.

In step S923, the print application 324 connects to the cloud server 104 via the network communication 313.

In step S924, the print application 324 acquires the setting value released in step S904 by the setting application 412 of the cloud server 104.

In step S925, the print application 324 checks whether the setting value acquired from the setting application 412 of the cloud server 104 has been updated from the setting value acquired the last time. If the setting value has not been updated from the setting value acquired the last time (NO in step S925), a series of processes ends. If the setting value has been updated from the setting value acquired the last time (YES in step S925), the processing proceeds to step S926. In step S926, the setting value stored in the HDD 204 of each of the MFPs 103 and 105 is updated and applied. In particular, when the setting "hold a print job in a device" 603 is enabled, a device operates in a forced holding mode of forcibly holding a received print job. When update processing of the setting value ends, a series of processes ends.

<Print Job Transmission Procedure>

A description will be given of an example of a procedure in which the user transmits a print job from the personal computer 102 to the MFP 103 serving as a document reception device. In the description below, a case is cited where authentication of the MFP 103 is managed by the authentication application 321.

In the present exemplary embodiment, an example of transmitting a print setting value and PDL data to the MFP 103 as a print job will be described. The PDL includes LIPS and PostScript, and the MFP 103 performs printing by interpreting the PDL data and performing raster image processor (RIP) processing. The print job needs to be in a format interpretable and printable by the MFP 103. In addition to the PDL data, the print job can be data in an image data format such as a Tag Image File Format (TIFF) and a document format of an application.

The user activates a printer driver from an application operating on the personal computer 102. After a print setting is performed on a printer driver screen (not illustrated), the user selects the MFP 103, and instructs the MFP 103 to perform printing. At this time, the user can also explicitly instruct hold printing.

If the printer driver receives a print instruction, the printer driver displays an authentication screen (not illustrated). After the user inputs authentication information, the user issues the print instruction. The printer driver transmits an authentication request to the MFP 103 together with a user name and a password. The authentication application 321 of the MFP 103 performs authentication by checking the received user name and password by communicating with the authentication application 410 on the cloud server 104, and transmits an authentication result to the personal computer 102. The printer driver receives the authentication result, and if the authentication has failed, the print processing ends as an error.

If the authentication has succeeded, the printer driver converts application data into PDL data and generates a print job. Furthermore, the printer driver includes user information and a designated print setting in the print job. The printer driver transmits the generated print job to the MFP 103.

At this time, if the personal computer 102 and the MFP 103 exist in the same authentication domain and the authentication result of the personal computer 102 is guaranteed, an authentication request needs not be transmitted to the MFP 103. At this time, user information of the personal computer 102 can be used. In addition, authentication processing from the printer driver can be omitted, and user information preregistered in the printer driver can be used.

<Print Job Reception Processing Procedure>

Figure 10:
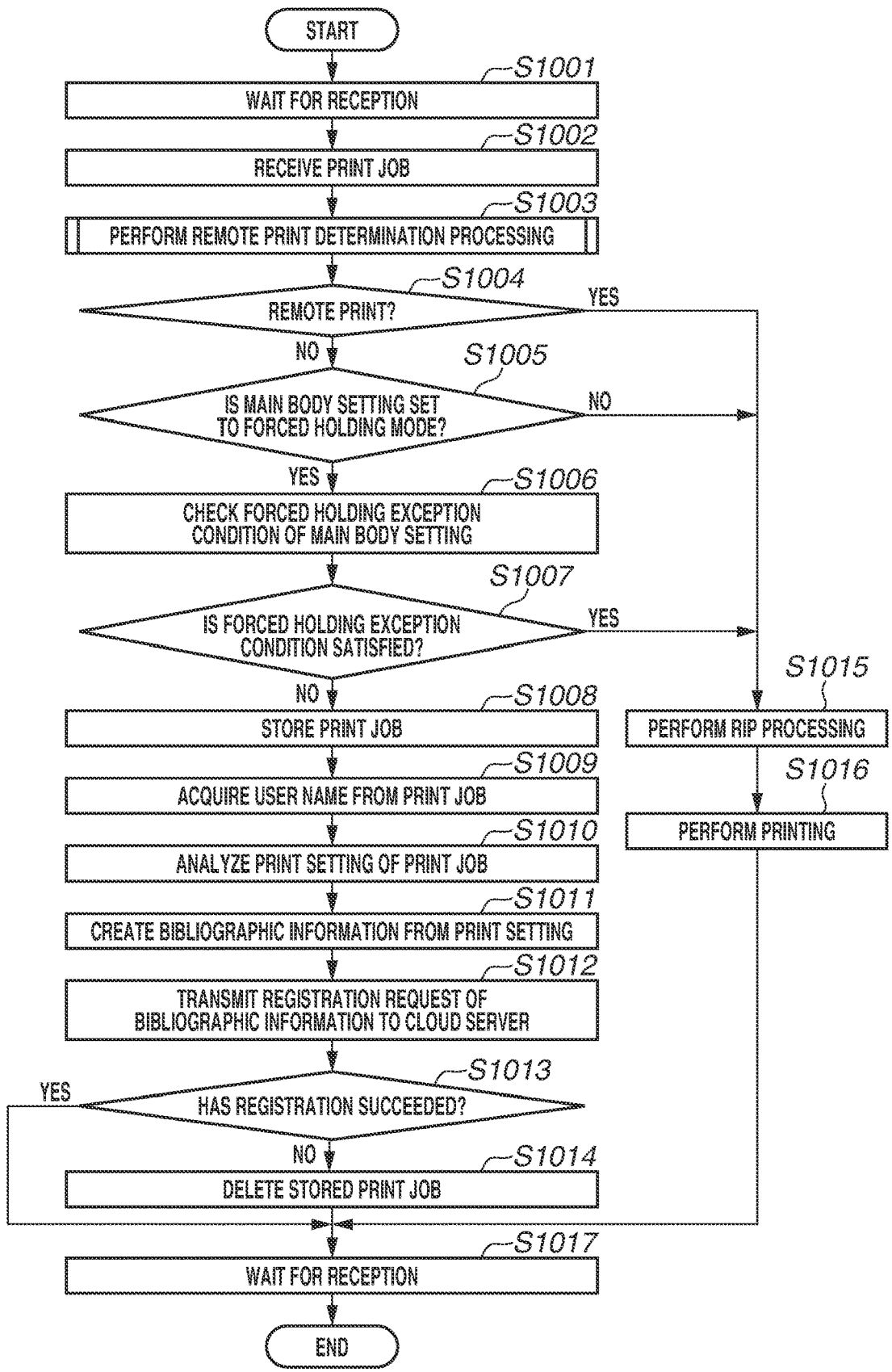
FIG. 10 is a flowchart illustrating an example of a document reception processing procedure of the MFP (document reception device).

FIG. 10 is a flowchart illustrating an example of a print job reception processing procedure in the MFP 103 serving as a document reception device according to the exemplary embodiment of the present disclosure, and the print job reception processing procedure is executed by the CPU 201 of the MFP 103.

First, in step S1001, the job device control 304 waits for reception of a print job. In step S1002, if the job device control 304 receives the print job via the network I/F 210, the job device control 304 notifies the print application 324 of the print job.

In step S1003, the print application 324 performs remote print determination processing of determining whether the received print job is a job transmitted from the document reception device. Details of the remote print determination processing will be described below with reference to FIG. 13.

In step S1004, the print application 324 determines whether remote print is to be performed. If it is determined that the remote print is to be performed (YES in step S1004), the processing proceeds to step S1015. In step S1015, the job device control 304 performs RIP processing on the print job based on the print setting. In step S1016, the job device control 304 performs printing by issuing a print instruction to the printer unit 209 via the device I/F 207.

If it is determined in step S1004 that the remote print is not to be performed (NO in step S1004), the print application 324 advances the processing to step S1005. In step S1005, the print application 324 checks whether the setting "hold a print job in a device" 603 (forced holding) set in step S926 is enabled as a main body setting. If the setting "hold a print job in a device" 603 is disabled (NO in step S1005), the print application 324 issues a print execution request to the job device control 304, and the processing proceeds to step S1015.

If it is determined in step S1005 that the setting "hold a print job in a device" 603 is enabled (YES in step S1005), the print application 324 advances the processing to step S1006. In step S1006, the print application 324 checks a forced holding exception condition of the MFP 103. The forced holding exception condition is a setting of instantly printing a print job without forcibly holding the print job when the received print job has the setting set to the exception condition. The forced holding exception condition can be set based on an IP address of a transmission source or network protocol information used for transmission.

In step S1007, the print application 324 determines based on print request source information of the received print job whether the forced holding exception condition is satisfied. If the exception condition is satisfied (YES in step S1007), the print data is printed without being held, and the processing proceeds to the print processing in step S1015 and subsequent steps.

In step S1007, if the forced holding exception condition is not satisfied (NO in step S1007), the processing proceeds to step S1008. In step S1008, the print application 324 stores the print job in the HDD 204 of the MFP 103. In step S1009, the print application 324 analyzes the stored print job and acquires a user name included in the print job.

In step S1010, the print application 324 analyzes a print setting of the stored print job. In step S1011, the print application 324 creates the bibliographic information 700 from the print setting of the stored print job that has been analyzed in step S1010.

In step S1012, the print application 324 transmits an addition/registration request of the bibliographic information 700 created in step S1011 to the bibliography management application 413 of the cloud server 104.

In step S1013, the print application 324 determines whether registration of the bibliographic information 700 in the bibliography management application 413 of the cloud server 104 has succeeded. If the registration of the bibliographic information 700 has succeeded (YES in step S1013), the processing proceeds to step S1017. In step S017, the print application 324 transitions to a print job reception waiting state again. If the registration of the bibliographic information 700 has failed (NO in step S1013), the processing proceeds to step S1014. In step S1014, the print application 324 deletes the print job stored in step S1008 from the HDD 204, and then, the processing proceeds to step S1017. In step S1017, the print application 324 transitions to the print job reception waiting state again. In the above-described manner, a series of processes performed in document reception ends.

As described above, the determination processing in step S1004 is performed after the remote print determination processing in step S1003, but the determination processing in step S1004 can be performed after it is determined that the exception condition is not satisfied (NO in step S1007).

<Display Processing Procedure of Print Queue>

Figure 11A:
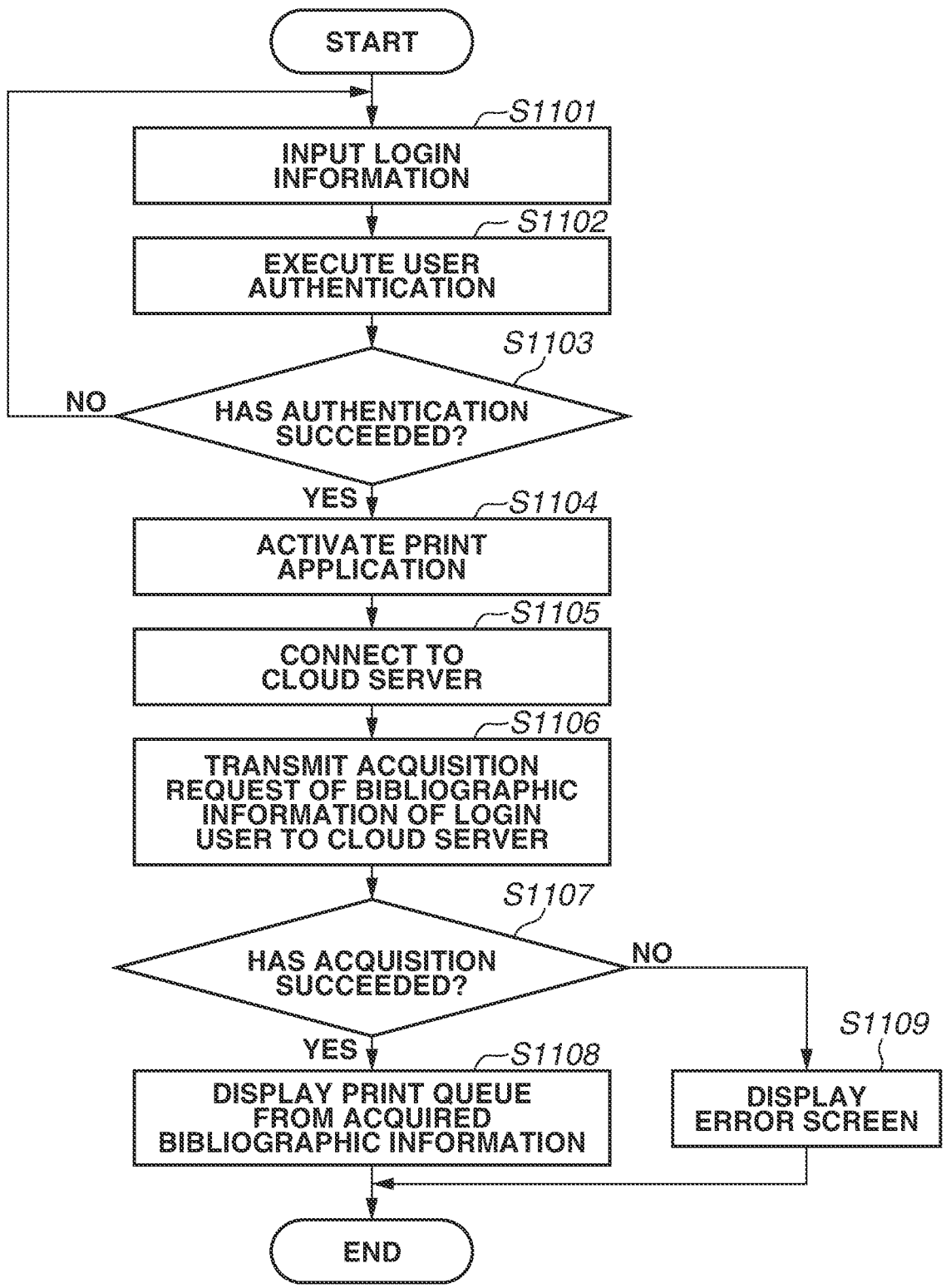
FIG. 11A is a flowchart illustrating an example of a processing procedure of print queue display of an MFP (output device) according to a first exemplary embodiment.

FIG. 11A is a flowchart illustrating an example of a list display processing procedure of a print queue in the MFP 105 serving as an output device according to the exemplary embodiment, and the list display processing procedure is executed by the CPU 201 of the MFP 105.

First, in step S1101, the authentication application 321 of the MFP (output device) 105 displays an authentication screen (not illustrated), and waits for an input of authentication information from the user. If the operation unit 206 receives the input of authentication information from the user, the operation unit 206 transmits the authentication information to the authentication application 321 via the operation unit I/F 205.

In step S1102, the authentication application 321 performs user authentication. In step S1103, the authentication application 321 determines whether the user authentication has succeeded. If it is determined that the user authentication has succeeded (YES in step S1103), the authentication application 321 notifies each of the applications 309 of an authentication result, and the processing proceeds to step S1104. If it is determined in step S1103 that the user authentication has failed (NO in step S1103), the processing returns to the processing in step S1101.

In step S1104, the print application 324 is activated by the user pressing the print icon 501 of the print application. In step S1105, the activated print application 324 connects to the cloud server 104 via the network communication 313.

In step S1106, the print application 324 transmits an acquisition request of bibliographic information associated with the authenticated user to the cloud server 104. The acquisition request includes a user name of the user authenticated in step S102.

In step S1107, the print application 324 determines whether acquisition of bibliographic information from the cloud server 104 has succeeded. If the acquisition has succeeded (YES in step S1107), the processing proceeds to step S1108. In step S1108, the print application 324 performs display control of the print queue display screen 510 on the operation unit 206 based on the acquired bibliographic information. If the acquisition of bibliographic information has failed (NO in step S1107), the processing proceeds to step S1109. In step S1109, the print application 324 displays an error screen on the operation unit 206.

<Print Processing Procedure>

Figure 11B:
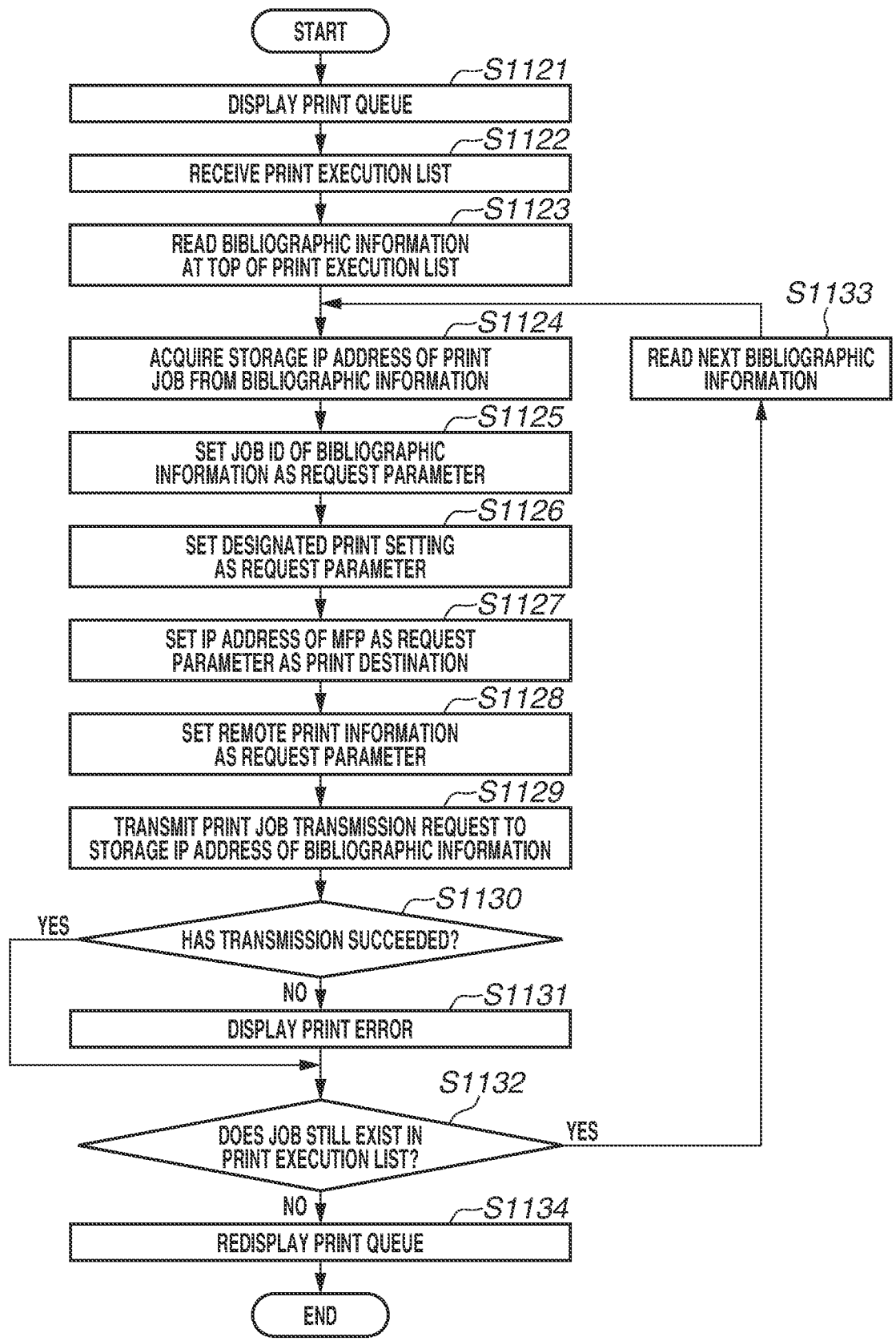
FIG. 11B is a flowchart illustrating an example of a print processing procedure of the MFP (output device) according to the first exemplary embodiment.

FIG. 11B is a flowchart illustrating an example of a print processing procedure operating when the print button 518 or 559 is pressed for a print job selected by the user in the MFP 105 serving as an output device according to the exemplary embodiment, and the print processing procedure is executed by the CPU 201 of the MFP 105.

First, in step S1121, the print application 324 performs display control of the print queue display screen 510 on the operation unit 206 of the MFP 105.

In step S122, the print application 324 receives a print execution job list indicating a print job selected by the user as a print instruction target from among print jobs displayed on the print queue display screen 510.

In step S1123, the print application 324 reads, from the ROM 203, bibliographic information of a print job at the top of the received print execution job list.

In step S1124, the print application 324 extracts a storage location (IP address, directory path) of the print job from the bibliographic information. In step S1125, the print application 324 extracts a job ID from the bibliographic information, and sets the job ID as one of print request parameters of the print job. The job ID is information for identifying print data. In step S1126, the print application 324 extracts a print setting from the bibliographic information, and sets the print setting as one of the print request parameters of the print job.

In step S1127, the print application 324 sets, as one of the print request parameters of the print job, an IP address of the operating MFP 105 to a transmission destination of the print job. In step S1128, the print application 324 sets, as one of the print request parameters of the print job, remote print information indicating that the print job received by the output device has been transmitted from the document reception device. The remote print information may be a character string or a numerical value generated from information regarding the storage location (IP address, directory path) of the print job or may be a predefined fixed character string or numerical value.

In step S1129, the print application 324 transmits a print job transmission request to the IP address indicating the storage location of the print job that has been acquired in step S1124, together with the print request parameters created in steps S1125, S126, S1127, and S1128.

In step S1130, the print application 324 determines whether transmission of the print job transmission request to the IP address of the storage location of the print job, i.e., the IP address of the MFP 103 serving as a document reception device, has succeeded. If the transmission has failed (NO in step S1130), the processing proceeds to step S1131. In step S1131, the print application 324 performs print error display on the operation unit 206. If the transmission has succeeded (YES in step S1130), the processing proceeds to step S1132.

In step S1132, the print application 324 checks whether all the print jobs that are print instruction targets have been executed. If an unexecuted print job still exists (YES in step S1132), the processing proceeds to step S1133. In step S1133, the print application 324 reads bibliographic information of a next print job, and repeatedly performs the processing in step S1124 and subsequent steps. If it is determined in step S1132 that the unexecuted print job does not exist (NO in step S1132), the processing proceeds to step S1134. In step S1134, the print application 324 redisplays a list of print queues on the operation unit 206. In this manner, a series of print processes ends.

In addition, even if the MFP 105 serving as an output device and the MFP 103 serving as a document reception device are the same device, the processing can still be operated without change while the IP address of the storage location becomes the same as the IP address of the print job transmission request destination.

<Print Job Request Response Procedure>

FIG. 12 is a flowchart illustrating an example of a processing procedure performed in the MFP 103 serving as a document reception device according to the exemplary embodiment. The processing procedure is a procedure of responding to a request for a print job for which the user has performed an operation to start printing in the MFP (output device) 105. The processing procedure is executed by the CPU 201 of the MFP 103.

First, in step S1201, the print application 324 waits for a request for a print job from the print application 324 operating in the MFP 105.

In step S1202, the print application 324 receives a transmission request for the print job from the print application 324 operating in the MFP 105.

In step S1203, the print application 324 acquires a job ID from a request parameter in the received transmission request for the print job. The request parameter of the job ID in the transmission request is set in step S125.

In step S1204, the print application 324 determines whether a print job with the acquired job ID exists in the HDD 204 of the MFP 103. If the print job does not exist (NO in step S1204), a print transmission result is determined to be a failure, and the processing proceeds to step S1213. If the print job exists (YES in step S1204), the processing proceeds to step S1205.

In step S1205, the print application 324 acquires print setting information from the request parameter in the received transmission request for the print job. The request parameter of the print setting in the transmission request is set in step S1126.

In step S1206, the print application 324 reads a print setting of a print job stored in the HDD 204 of the MFP 103.

In step S1207, the print application 324 compares the read print setting of the stored print job with the print setting in the transmission request parameter, and checks whether there is a difference between the print settings. If there is the difference between the print settings (YES in step S1207), the processing proceeds to step S1208. In step S1208, the print application 324 overwrites and updates the print job stored in the HDD 204 of the MFP 103 with the print setting in the transmission request parameter. The print setting to be overwritten corresponds to the job setting parameter 804 and the job finishing parameter 810 in the print job 800. If there is no difference between the print settings (NO in step S1207), the processing proceeds to step S1213. The processing in step S1213 will be described below.

In step S1209, the print application 324 acquires remote print information from the request parameter in the received transmission request for the print job. The request parameter of the remote print information in the transmission request is set in step S1128.

In step S1210, the print application 324 adds the acquired remote print information to the job start parameter 802 corresponding to a header region in the print job 800.

In step S1211, the print application 324 acquires a print job transmission destination IP address in the transmission request parameter. The print job transmission destination IP address in the transmission request parameter is set in step S127.

In step S1212, the print application 324 transmits the print job to the acquired print job transmission destination IP address of the MFP 105 serving as an output device.

In step S1213, the print application 324 transmits a response result of the transmission request for the print job to the print application 324 operating in the MFP 105. In this manner, a series of processes of responding to the request for the print job ends.

In some cases, print data transmitted in step S1212 is print data having an attribute of secure printing. The print data having the attribute of secure printing requires a password input when a print execution instruction is received. However, in a case where user authentication has been performed, the password input can be omitted to avoid double authentication. Nevertheless, even if a hold setting of a printing apparatus is disabled, the print data having the attribute of secure printing is held in the printing apparatus. For this reason, since the print data having the attribute of secure printing that is transmitted from the document reception device to the output device is held in the output device again, the document reception device deletes the attribute of secure printing and transmits the print data to the output device as normal print data.

<Remote Print Determination Processing Procedure>

Figure 13:
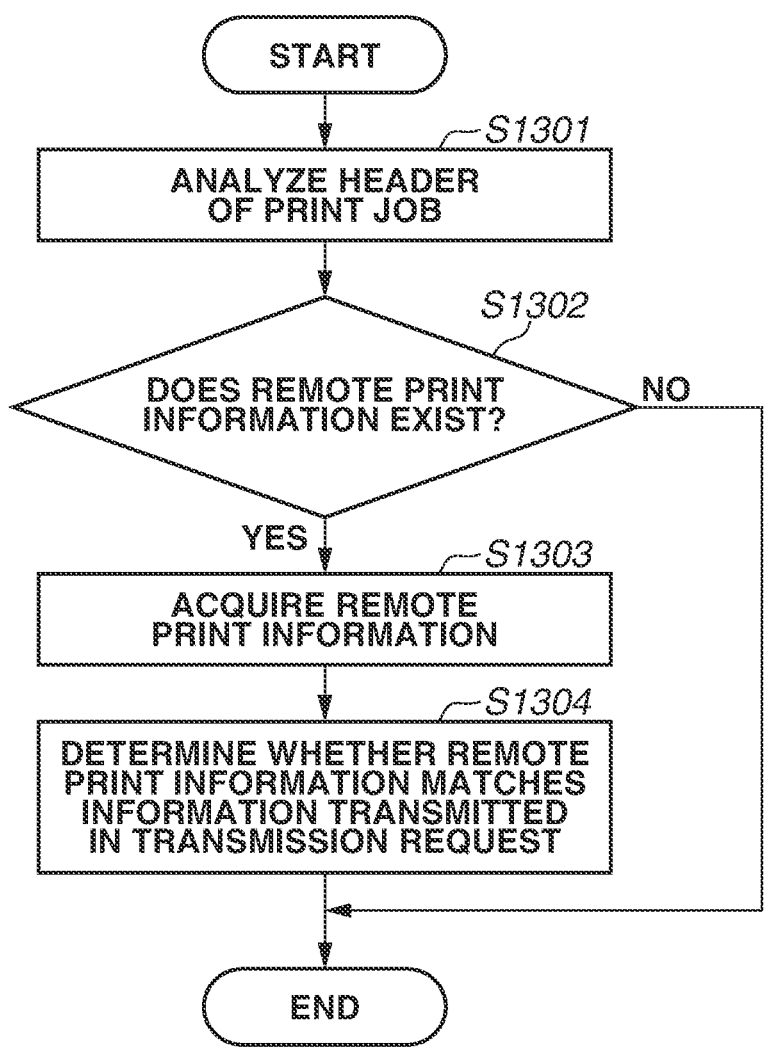
FIG. 13 is a flowchart illustrating an example of a remote print determination processing procedure of the MFP according to the first exemplary embodiment.

FIG. 13 is a flowchart illustrating an example of the remote print determination processing procedure (step S1003) in the print job reception processing procedure in the MFP 105 serving as an output device according to the exemplary embodiment. The remote print determination processing procedure is executed by the CPU 201 of the MFP 105. The processing is processing for determining whether a print request including print data is a print request transmitted from a different printing apparatus.

In step S1301, the print application 324 analyzes a header region (job start parameter 802) of the received print job.

In step S1302, the print application 324 determines whether remote print information is included in header information analyzed in step S1301. If the remote print information is not included in the header information (NO in step S1302), it is determined that the remote print information does not exist, and the remote print determination processing ends.

If the print application 324 determines in step S1302 that the remote print information is included in the header information analyzed in step S1301 (YES in step S1302), the processing proceeds to step S1303. In step S1303, the print application 324 acquires the remote print information from the analyzed header information. The remote print information is information added in step S1210.

In step S1304, the print application 324 determines whether the remote print information acquired in step S1303 matches the remote print information set as the request parameter in the transmission request in step S1128. If it is determined that the acquired remote print information matches the set remote print information, it can be determined that the received print request is a print instruction of a print job transmitted from the document reception device (remote print). Thus, in the print job reception processing procedure, the print job is printed in the processes in step S1015 and subsequent steps without being held. In this manner, the remote print determination processing of the print job ends.

As described above, in the present exemplary embodiment, if a printing apparatus receives a print request from a different printing apparatus, the printing apparatus performs printing upon receiving the print request without holding print data included in the print request. This can shorten a time from when a print instruction is received from the user on an operation panel of the printing apparatus to when the print data is printed.

In a second exemplary embodiment, description will be given of another exemplary embodiment of an addition method of remote print information and a remote print determination processing method that are different from those described in the first exemplary embodiment. Hereinafter, description of the same components as those in the first exemplary embodiment will be omitted, and a difference from the first exemplary embodiment will be mainly described.

<Print Processing Procedure>

Figure 14:
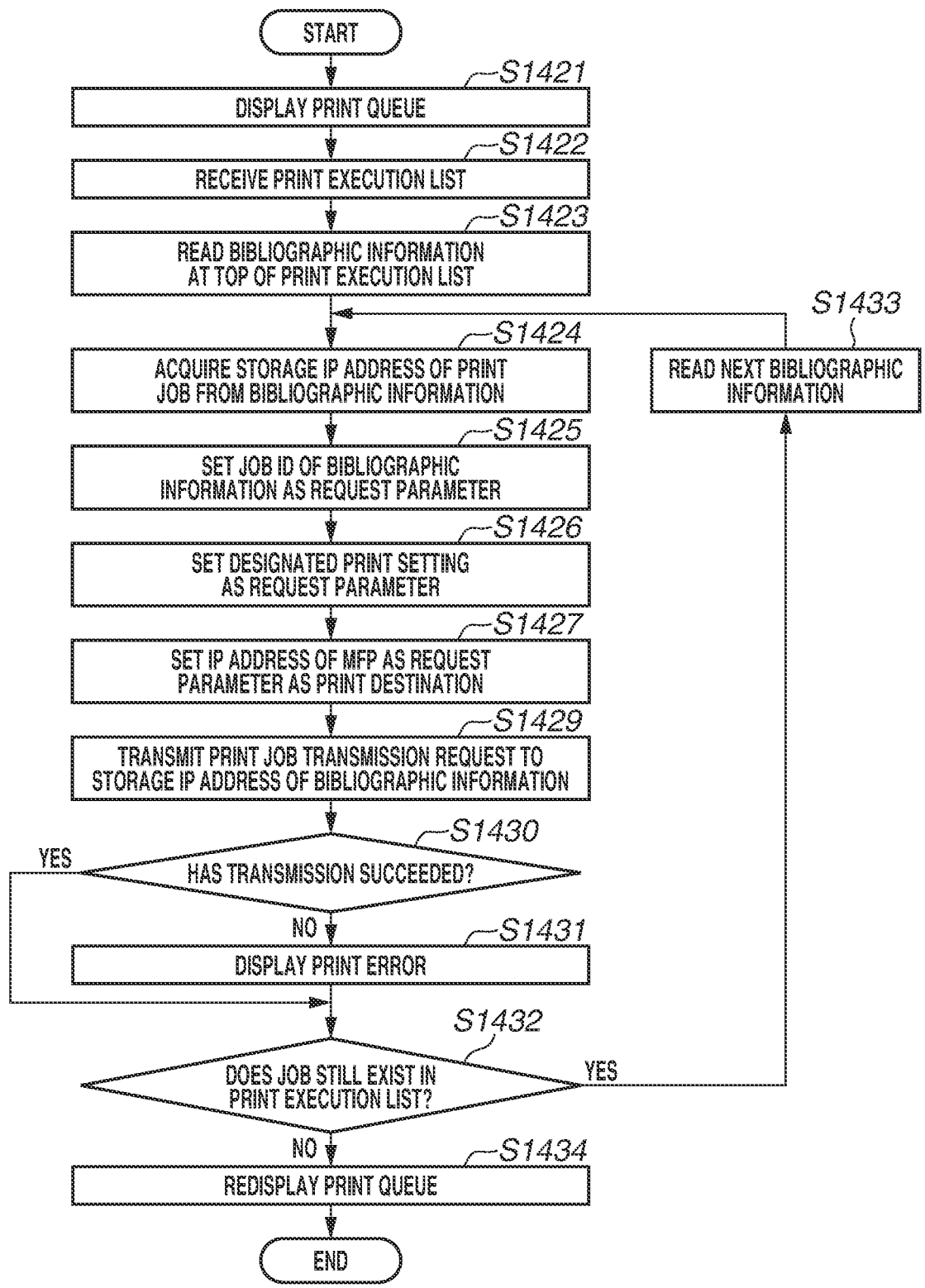
FIG. 14 is a flowchart illustrating an example of a print processing procedure of an MFP (output device) according to a second exemplary embodiment.

FIG. 14 is a flowchart illustrating an example of a print processing procedure according to the second exemplary embodiment, and illustrates a modified example of the print processing procedure according to the first exemplary embodiment illustrated in FIG. 11B.

A difference lies in that the processing of setting the remote print information as the request parameter in step S1128 is not included. Thus, processing in steps S1421 to S1427 is similar to the processing in steps S1121 to S1127, and processing in steps S1429 to 1434 is similar to the processing in steps S1129 to S1134.

<Print Job Request Response Procedure>

Figure 15:
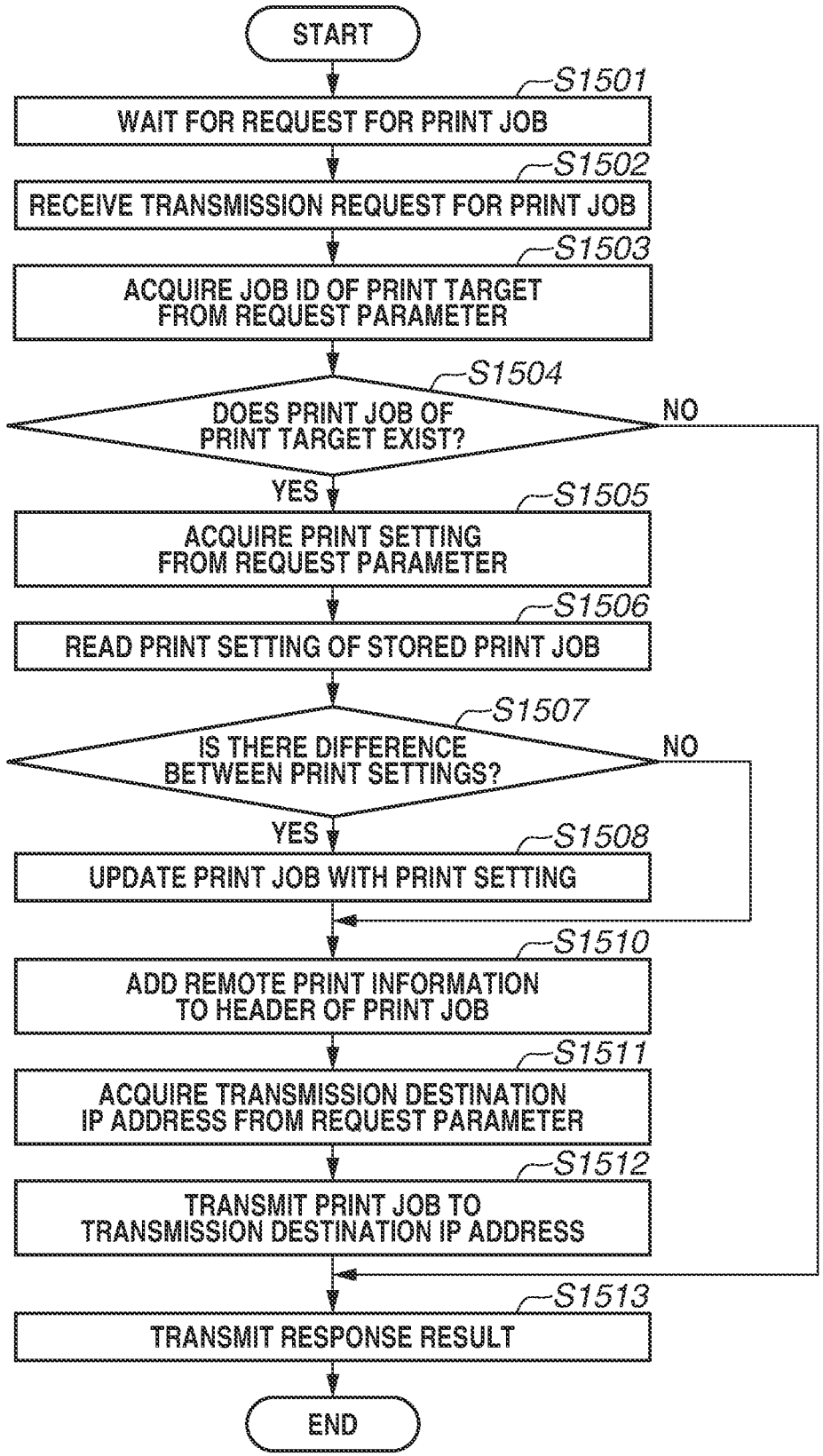
FIG. 15 is a flowchart illustrating an example of a processing procedure of a request response to a print job of an MFP (document reception device) according to the second exemplary embodiment.

FIG. 15 is a flowchart illustrating an example of a print job request response procedure according to the second exemplary embodiment, and illustrates a modified example of the print job request response procedure according to the first exemplary embodiment illustrated in FIG. 12.

A difference lies in that the processing of acquiring the remote print information from the request parameter in step S1209 is not included, and another difference also lies in the addition method of the remote print information in step S1210. Except for these points, processing in steps S1501 to S1508 is similar to the processing in steps S1201 to S1208, and processing in steps S1511 to S1513 is similar to the processing in steps S1211 to S1213.

In step S1510, the print application 324 adds predetermined remote print information to the job start parameter 802 corresponding to the header region in the print job 800. The predetermined remote print information may be uniquely-defined information such as a specific character string or numerical value, or may differently use several patterns.

<Remote Print Determination Processing Procedure>

Figure 16:
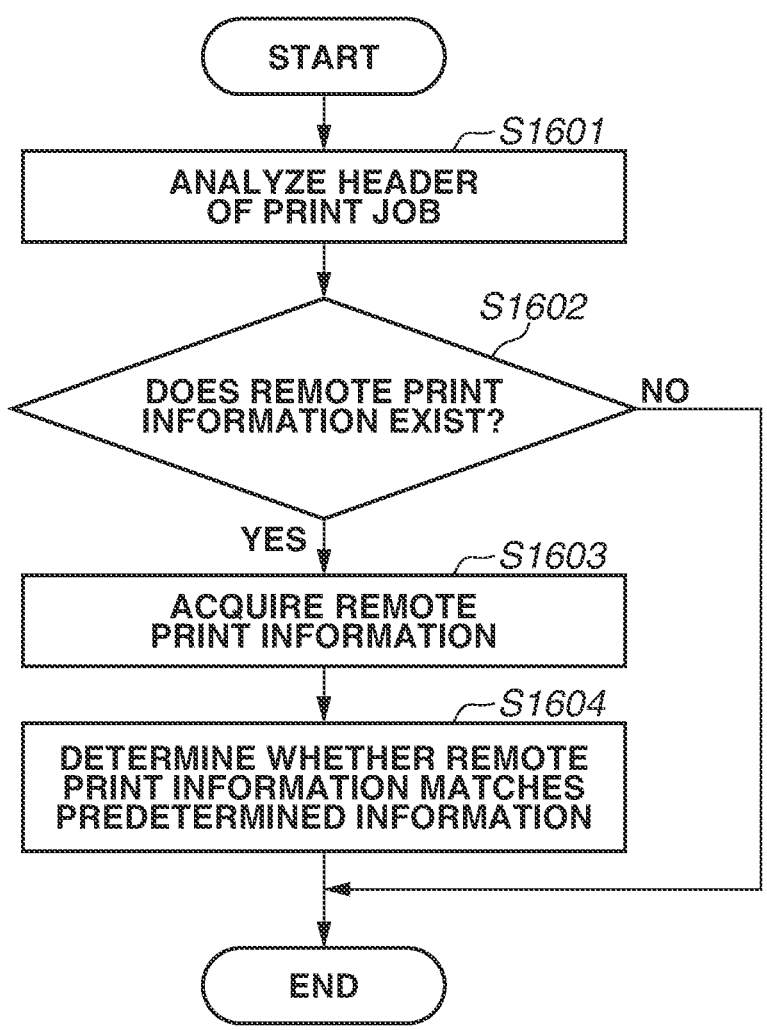
FIG. 16 is a flowchart illustrating an example of a remote print determination processing procedure of the MFP according to the second exemplary embodiment.

FIG. 16 is a flowchart illustrating an example of a remote print determination processing procedure (step S1003) according to the second exemplary embodiment, and illustrates a modified example of the remote print determination processing procedure according to the first exemplary embodiment illustrated in FIG. 13.

A difference lies in the match determination processing of the remote print information in step S1304. Except for the processing, processing in steps S1601 to S1603 is similar to the processing in steps S1301 to S1303.

In step S1604, the print application 324 determines whether the remote print information acquired in step S1602 matches the predetermined remote print information. If it is determined that the acquired remote print information matches the predetermined remote print information, it can be determined that the received print request is a print instruction of a print job transmitted from the document reception device (remote print). Thus, in the print job reception processing procedure, the print job is printed in the processes in step S1015 and subsequent steps without being held.

As described above, in the present exemplary embodiment, the description has been given of the example in which the remote print information notified by the output device to the document reception device is included in the print request transmitted from the document reception device to the output device. Accordingly, the printing apparatus can determine that the received print request is a print request transmitted from a different printing apparatus and print the print data without holding the print data in the storage unit of the printing apparatus.

In a third exemplary embodiment, description will be given of another exemplary embodiment of an addition method of remote print information and a remote print determination processing method, which are different from those described in the first exemplary embodiment. Hereinafter, description of the same components as those in the first exemplary embodiment will be omitted, and a difference from the first exemplary embodiment will be mainly described.

<Print Processing Procedure>

The print processing procedure according to the third exemplary embodiment is similar to the print processing procedure according to the second exemplary embodiment illustrated in FIG. 14.

<Print Job Request Response Procedure>

Figure 17:
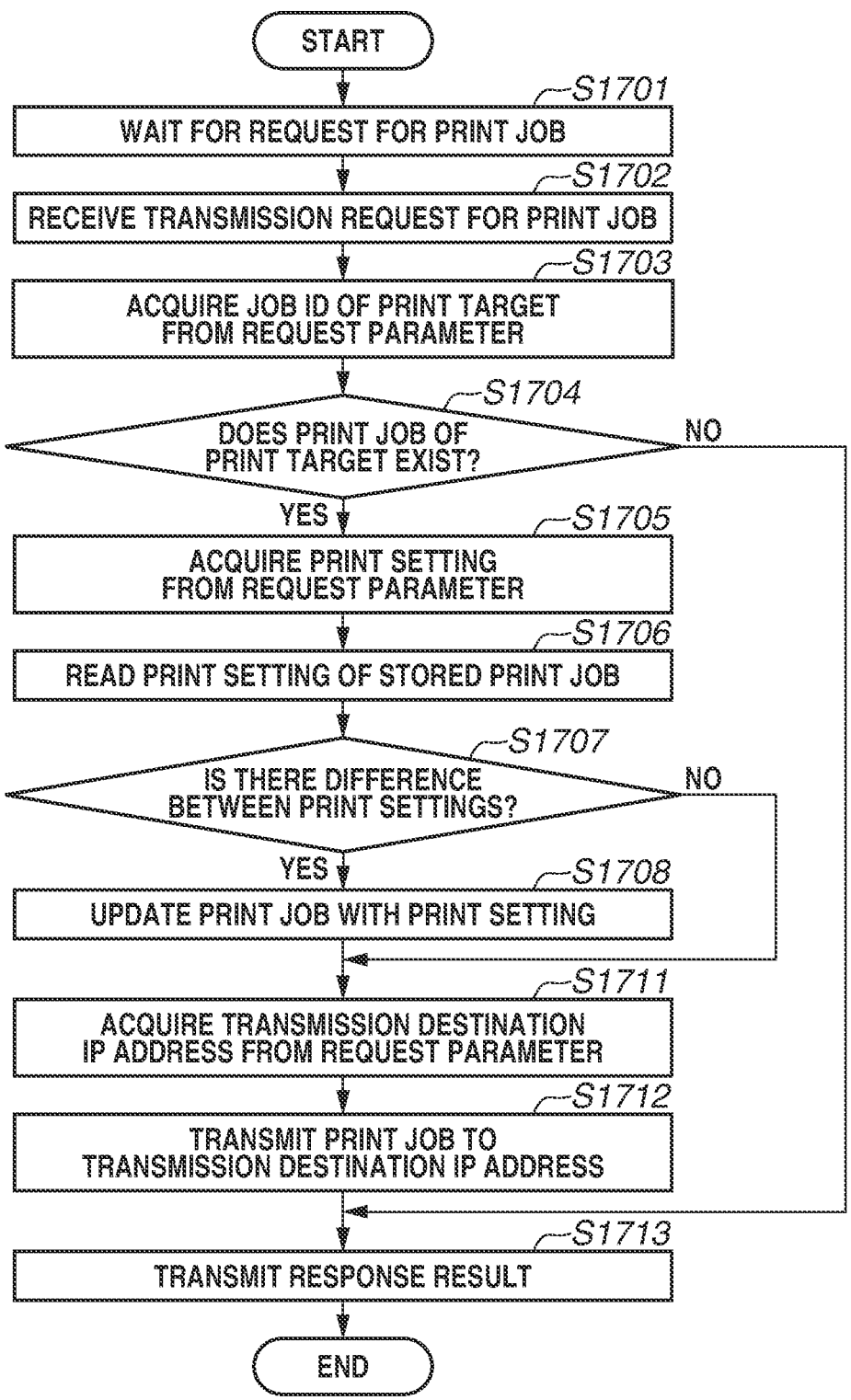
FIG. 17 is a flowchart illustrating an example of a processing procedure of a request response to a print job of an MFP (document reception device) according to a third exemplary embodiment.

FIG. 17 is a flowchart illustrating an example of a print job request response procedure according to the third exemplary embodiment, and illustrates a modified example of the print job request response procedure according to the first exemplary embodiment illustrated in FIG. 12.

A difference lies in that the processing of acquiring the remote print information from the request parameter in step S1209 and the addition processing of the remote print information in step S1210 are not included. Except for these points, processing in steps S1701 to S1708 is similar to the processing in steps S1201 to S1208, and processing in S1711 to S1713 is similar to the processing in steps S1211 to S1213.

<Remote Print Determination Processing Procedure>

FIG. 18 is a flowchart illustrating an example of a remote print determination processing procedure (step S1003) according to the third exemplary embodiment, and illustrates a modified example of the remote print determination processing procedure according to the first exemplary embodiment illustrated in FIG. 13.

In step S1801, the print application 324 acquires an IP address of a transmission source of the received print job. The IP address can be simultaneously acquired as information regarding a transmission source when the job device control 304 receives the print job via the network I/F 210 in step S1002.

In step S1802, the print application 324 connects to the cloud server 104 via the network communication 313, and acquires a list of IP addresses of the devices 624 managed by the device management application 411. However, timing of acquisition of the IP addresses is not limited to this. An IP address may be notified to each of the devices at a time point at which there is a change in the devices managed by the device management application 411, and each of the devices can store the IP address in advance. In addition, the list of IP addresses can also include a local host address indicating print job transmission from the same device.

In step S1803, the print application 324 determines whether the IP address of the transmission source that has been acquired in step S1801 is included in the list of IP addresses acquired in step S1802. If it is determined that the IP address is included in the list of IP addresses, it can be determined that the received print request is a print instruction of a print job transmitted from the document reception device (remote print). Thus, in the print job reception processing procedure, the print job is printed in the processes in step S1015 and subsequent steps without being held.

As described above, in the present exemplary embodiment, the description has been given of the example in which the received print request is determined to be a print request transmitted from a different printing apparatus in the same network based on the IP address of the document reception device included in the print request transmitted from the document reception device to the output device. Accordingly, the printing apparatus can determine that the received print request is a print request transmitted from a different printing apparatus and print the print data without holding the print data in the storage unit of the printing apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-120040, filed Jun. 27, 2019, which is hereby incorporated by reference herein in its entirety.

What is claimed is:

1. A printing apparatus comprising:
an operation device;
one or more memories storing a set of instructions; and
one or more processors that execute the set of instructions to:
receive a print request including print data;
store the print data included in the received print request in the one or more memories; and
print the stored print data based on a user instruction via the operation device,
wherein, in a case where the received print request includes remote print information indicating that the received print request is a print request transmitted from a different printing apparatus and the remote print information contains the same information transmitted from the printing apparatus to the different printing apparatus, the print data included in the received print request is printed without the user instruction via the operation device, and
wherein, in a case where the received print request does not include the remote print information, the received print request is determined not to be the print request transmitted from the different printing apparatus.

2. The printing apparatus according to claim 1, wherein the remote print information included in the received print request is information set by the different printing apparatus.

3. The printing apparatus according to claim 1, wherein the remote print information included in the received print request is information notified by the printing apparatus to the different printing apparatus.

4. The printing apparatus according to claim 1,
wherein the processors further execute the set of the instructions to acquire respective IP addresses of a plurality of printing apparatuses connected to a same network as a network to which the printing apparatus is connected, and
wherein, in a case where any IP address of the acquired IP addresses is added to the received print request, the received print request is determined to be the print request transmitted from the different printing apparatus.

5. The printing apparatus according to claim 1,
wherein the processors further execute the set of the instructions to transmit information for identifying print data to the different printing apparatus, and
wherein a print request including the print data identified based on the information for identifying the print data is received from the different printing apparatus.

6. The printing apparatus according to claim 5,
wherein the processors further execute the set of the instructions to:
authenticate a user;
acquire information including a list of print data associated with the authenticated user from a management server configured to manage bibliographic information about print data;
receive selection of print data to be a print instruction target from the list of print data associated with the authenticated user; and
identify the different printing apparatus storing the selected print data based on the acquired information, and
wherein information for identifying the selected print data is transmitted to the identified different printing apparatus.

7. A printing system including a first printing apparatus and a second printing apparatus,
the first printing apparatus comprising:
an operation device;
one or more first memories storing first instructions; and
one or more first processors that execute the first instructions to:
transmit information for identifying print data for which a print instruction is received from a user to the second printing apparatus,
receive a print request including the print data from the second printing apparatus;
store the print data included in the received print request in the one or more first memories; and
in a case where the received print request includes remote print information indicating that the received print request is a print request transmitted from the second printing apparatus and the remote print information contains the same information transmitted from the first printing apparatus to the second printing apparatus, print the stored print data without the user instruction via the operation device, and
wherein, in a case where the received print request does not include the remote print information, the received print request is determined not to be the print request transmitted from the different printing apparatus;
the second printing apparatus comprising:
one or more second memories storing second instructions; and
one or more second processors that execute the second instructions to receive the information for identifying the print data from the first printing apparatus; and
transmit the print request including the print data identified based on the information for identifying the print data to the first printing apparatus.

8. The printing system according to claim 7, wherein, in a case where the print data identified based on the information for identifying print data is print data having an attribute of secure printing, a print request including the print data from which the attribute of the secure printing has been deleted is transmitted to the first printing apparatus.

9. A control method for a printing apparatus, the control method comprising:
receiving a print request including print data;
storing the print data included in the received print request in one or more memories of the printing apparatus; and
printing the store print data based on a user instruction via the operation device,
wherein, in a case where the received print request includes remote print information indicating that the received print request is a print request transmitted from a different printing apparatus and the remote print information contains the same information transmitted from the printing apparatus to the different printing apparatus, the print data included in the received print request is printed without the user instruction via the operation device, and
wherein, in a case where the received print request does not include the remote print information, the received print request is determined not to be the print request transmitted from the different printing apparatus.

10. A non-transitory computer readable storage medium storing a computer program for causing a computer to execute a control method for a printing apparatus, the control method comprising:
receiving a print request including print data;
storing the print data included in the received print request in one or more memories of the printing apparatus; and
printing the store print data based on a user instruction via the operation device,
wherein, in a case where the received print request includes remote print information indicating that the received print request is a print request transmitted from a different printing apparatus and the remote print information contains the same information transmitted from the printing apparatus to the different printing apparatus, the print data included in the received print request is printed without the user instruction via the operation device, and
wherein, in a case where the received print request does not include the remote print information, the received print request is determined not to be the print request transmitted from the different printing apparatus.

* * * * *